United States Patent
Kamiguchi et al.

(10) Patent No.: US 9,240,202 B1
(45) Date of Patent: Jan. 19, 2016

(54) SPIN-VALVE ELEMENT, HARD DISK HEAD, AND HARD DISK HEAD ASSEMBLY

(71) Applicant: KABUSHIKI KAISHA TOSHIBA, Tokyo (JP)

(72) Inventors: Yuuzo Kamiguchi, Kanagawa (JP); Masayuki Takagishi, Tokyo (JP); Hitoshi Iwasaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/802,114

(22) Filed: Jul. 17, 2015

(30) Foreign Application Priority Data

Aug. 1, 2014 (JP) ................................. 2014-157426

(51) Int. Cl.
  *G11B 5/33* (2006.01)
  *G11B 5/39* (2006.01)
  *G11B 5/127* (2006.01)

(52) U.S. Cl.
  CPC ............... *G11B 5/3912* (2013.01); *G11B 5/33* (2013.01); *G11B 5/3932* (2013.01); *G11B 5/127* (2013.01)

(58) Field of Classification Search
  CPC ................................... G11B 5/33; G11B 5/127
  USPC ......................................... 360/324.1, 324.12
  See application file for complete search history.

(56) References Cited

U.S. PATENT DOCUMENTS

| 2002/0141120 A1* | 10/2002 | Gill | ........................ B82Y 10/00 360/324.2 |
| 2006/0091993 A1* | 5/2006 | Shoji | .................... G01R 15/205 338/32 R |

FOREIGN PATENT DOCUMENTS

| JP | 2012-234602 | 11/2012 |
| JP | 2013-20672 | 1/2013 |

OTHER PUBLICATIONS

Jeon et al., "Electrical spin injection and accumulation in CoFe/MgO/Ge contacts at room temperature", *Physical Review B*, vol. 84, 165315, 2011, pp. 165315-1-165315-10.

Brataas et al., "Finite-Element Theory of Transport in Ferromagnet—Normal Metal Systems", *Physical Review Letters*, vol. 84, No. 11, Mar. 13, 2000, pp. 2481-2484.

* cited by examiner

*Primary Examiner* — Allen T Cao
(74) *Attorney, Agent, or Firm* — Nixon & Vanderhye, P.C.

(57) ABSTRACT

According to one embodiment, a spin-valve element includes a nonmagnetic unit, a first magnetic unit, a second magnetic unit, a third magnetic unit, a current source, and a voltage sensor. The current source is connected to the second magnetic unit and the third magnetic unit. The current source causes a current to flow between the second magnetic unit and the third magnetic unit via the nonmagnetic unit. The voltage sensor is connected to the second magnetic unit and the third magnetic unit. A maximum length of a contact surface between the first magnetic unit and the nonmagnetic unit is not more than a spin diffusion length of the nonmagnetic unit. A length of the first magnetic unit in a direction orthogonal to the contact surface is not more than 3 times a spin diffusion length of the first magnetic unit. The first magnetic unit does not contact an external electrode.

20 Claims, 12 Drawing Sheets

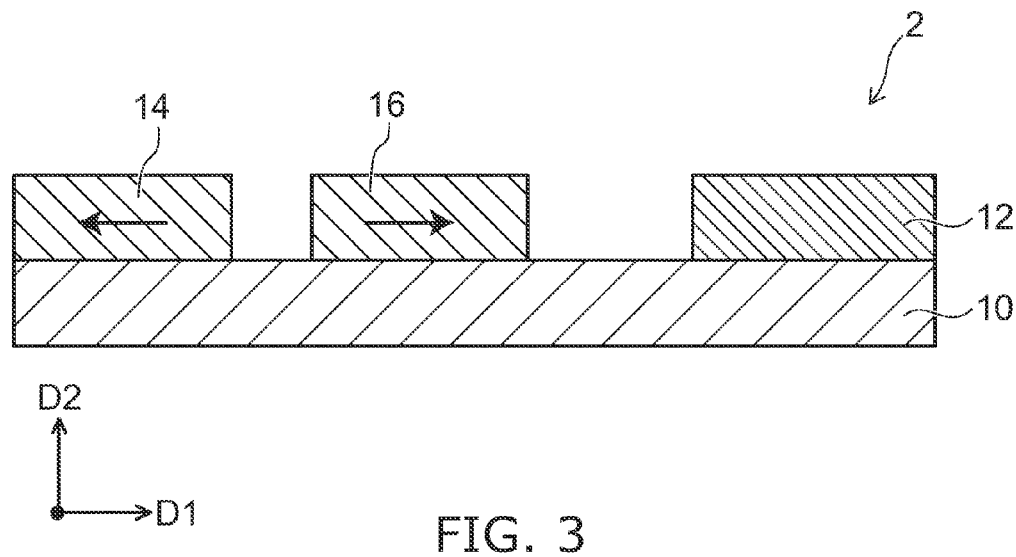
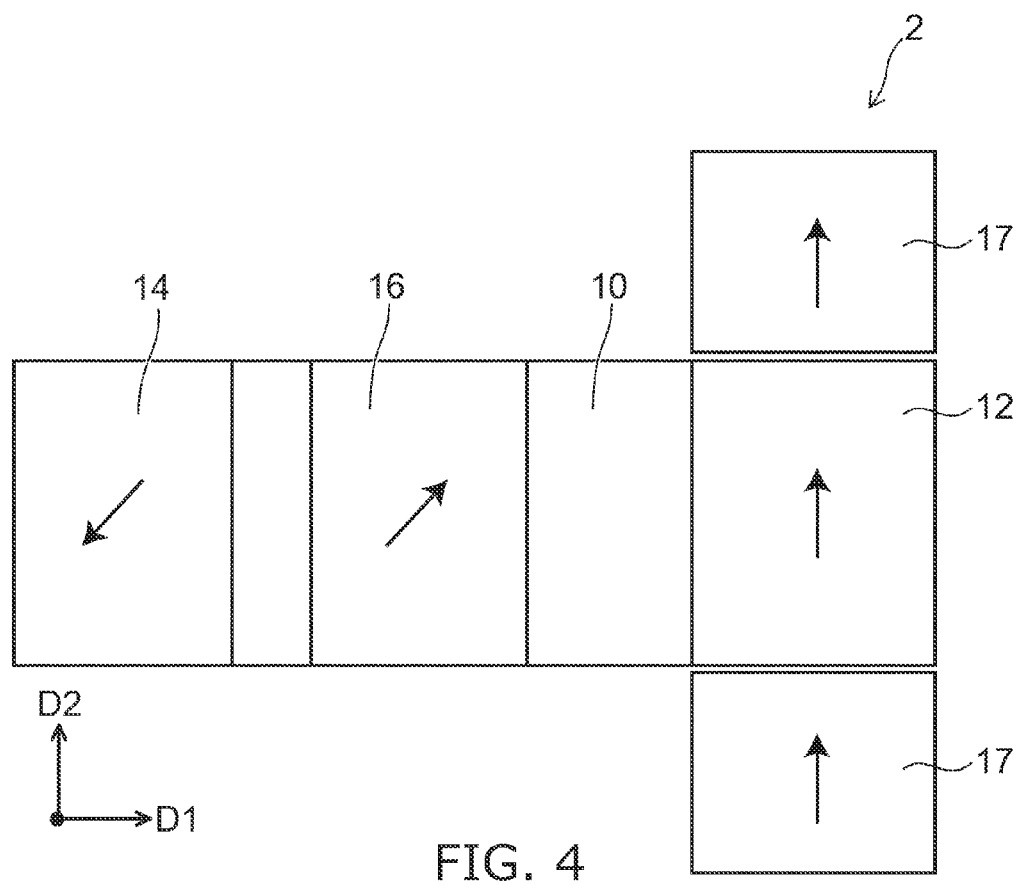

US 9,240,202 B1

SPIN-VALVE ELEMENT, HARD DISK HEAD, AND HARD DISK HEAD ASSEMBLY

CROSS-REFERENCE TO RELATED APPLICATIONS

This application is based upon and claims the benefit of priority from Japanese Patent Application No. 2014-157426, filed on Aug. 1, 2014; the entire contents of which are incorporated herein by reference.

FIELD

Embodiments of the invention relate to a spin-valve element, a hard disk head, and a hard disk head assembly.

BACKGROUND

The reproduction of a recorded signal of a hard disk drive is performed by using a magnetic sensor to sense a leakage magnetic field from recorded bits written to a magnetic disk. The size of each recorded bit is becoming extremely small as the recording density is increased. Therefore, both a smaller magnetic sensor and higher sensitivity are desirable.

A spin-valve element has been proposed as a magnetic sensor that can be provided in a micro gap between magnetic shields. However, for such a spin-valve element, it is desirable to develop a structure to make even further size reductions possible.

BRIEF DESCRIPTION OF THE DRAWINGS

FIG. 3 is a cross-sectional view of the spin-valve element according to the second embodiment;

FIG. 4 is a plan view of the modification of the spin-valve element according to the second embodiment;

DETAILED DESCRIPTION

Figure 1:
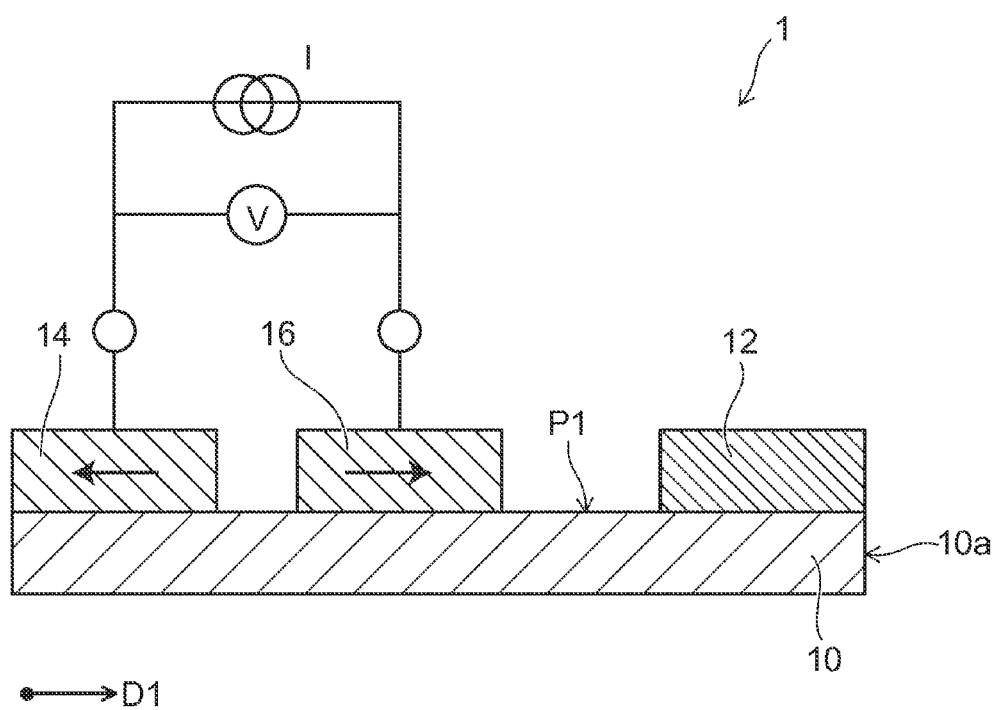
FIG. 1 is a cross-sectional view of the spin-valve element according to the first embodiment.

According to one embodiment, a spin-valve element includes a nonmagnetic unit, a first magnetic unit, a second magnetic unit, a third magnetic unit, a current source, and a voltage sensor. The nonmagnetic unit extends in a first direction. The first magnetic unit contacts the nonmagnetic unit. A direction of magnetization of the first magnetic unit is changeable. The second magnetic unit is separated from the first magnetic unit. The second magnetic unit contacts the nonmagnetic unit. A direction of magnetization of the second magnetic unit is pinned. A third magnetic unit is separated from the first magnetic unit and the second magnetic unit. The third magnetic unit contacts the nonmagnetic unit. A direction of magnetization of the third magnetic unit is pinned in a direction different from the direction of the magnetization of the second magnetic unit. The current source is connected to the second magnetic unit and the third magnetic unit. The current source causes a current to flow between the second magnetic unit and the third magnetic unit via the nonmagnetic unit. The voltage sensor is connected to the second magnetic unit and the third magnetic unit. The voltage sensor senses a voltage between the second magnetic unit and the third magnetic unit. A maximum length of a contact surface between the first magnetic unit and the nonmagnetic unit is not more than a spin diffusion length of the nonmagnetic unit. A length of the first magnetic unit in a direction orthogonal to the contact surface is not more than 3 times a spin diffusion length of the first magnetic unit. The first magnetic unit does not contact an external electrode.

DESCRIPTION OF EMBODIMENTS

Embodiments of the invention will now be described with reference to the drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even in the case where the same portion is illustrated.

In the drawings and the specification of the application, components similar to those described in regard to a drawing thereinabove are marked with like reference numerals, and a detailed description is omitted as appropriate.

The arrows in the drawings illustrate directions of magnetization.

First Embodiment

A spin-valve element 1 according to a first embodiment will now be described using FIG. 1.

FIG. 1 is a cross-sectional view of the spin-valve element 1 according to the first embodiment.

The spin-valve element 1 includes a nonmagnetic unit 10, a free magnetic unit (a first magnetic unit) 12, a first fixed magnetic unit (a second magnetic unit) 14, and a second fixed magnetic unit (a third magnetic unit) 16. The free magnetic unit 12, the first fixed magnetic unit 14, and the second fixed magnetic unit 16 are separated from each other and contact the nonmagnetic unit 10. The nonmagnetic unit 10 extends along a first direction. The nonmagnetic unit 10 has a first surface P1 parallel to the first direction. The free magnetic unit 12, the first fixed magnetic unit 14, and the second fixed magnetic unit 16 are provided on the surface P1 of the nonmagnetic unit 10. The first fixed magnetic unit 14, the second fixed magnetic unit 16, and the free magnetic unit 12 are provided to be arranged in the first direction. The length in the first direction of the nonmagnetic unit 10 is shorter than a spin relaxation length $\lambda n$ of the nonmagnetic unit 10.

The first direction is, for example, a direction D1 shown in FIG. 1.

The first fixed magnetic unit 14 and the second fixed magnetic unit 16 include magnetic layers having pinned directions of magnetization. The direction of the magnetization of the second fixed magnetic unit 16 is pinned to be in a direction that is different from the direction of the magnetization of the first fixed magnetic unit 14.

It is sufficient for the magnetization direction of the second fixed magnetic unit 16 to be different from the magnetization direction of the first fixed magnetic unit 14 so that the change of the electrical resistance between the first fixed magnetic unit 14 and the second fixed magnetic unit 16 due to the angle of the magnetization direction of the free magnetic unit 12 described below is sensible.

For example, the first fixed magnetic unit 14 is magnetized in the first direction; and the second fixed magnetic unit 16 is magnetized in the direction opposite to the first direction.

Hereinbelow, the directions of the magnetizations of two magnetic bodies are called antiparallel when the directions are parallel to each other and opposite to each other.

The free magnetic unit 12 includes a magnetic layer having a changeable direction of magnetization. The direction of magnetization being changeable means that the direction of magnetization is changeable according to an external magnetic field. The magnetization direction of the free magnetic unit 12 changes more easily than the first fixed magnetic unit 14 and the second fixed magnetic unit 16 when the external magnetic field is applied.

The first fixed magnetic unit 14 and the second fixed magnetic unit 16 are connected to a current source and a voltage sensor. A sense current flows in the nonmagnetic unit 10 via the first fixed magnetic unit 14 and the second fixed magnetic unit 16. The current flows in via one of the two fixed magnetic units; and the current flows out via the other fixed magnetic unit. The electrical resistance of the fixed magnetic unit is different for the majority-spin electrons and the minority-spin electrons. Therefore, a spin-polarized current also flows outside the region of the nonmagnetic unit 10 between the first fixed magnetic unit 14 and the second fixed magnetic unit 16. Accordingly, the electrochemical potential of the conduction electrons inside the nonmagnetic unit 10 has different values for the spin-up electrons and the spin-down electrons.

Hereinbelow, the difference $(\mu\uparrow-\mu\downarrow)$ of the electrochemical potentials of the spin-up electrons and the spin-down electrons also is called the spin accumulation.

Because the magnetization direction of the first fixed magnetic unit 14 is opposite to the magnetization direction of the second fixed magnetic unit 16, spin accumulation occurs so that the spin-up current $\mu\uparrow$ becomes large at both a first contact surface between the first fixed magnetic unit 14 and the nonmagnetic unit 10 and a second contact surface between the second fixed magnetic unit 16 and the nonmagnetic unit 10. The distance between the first fixed magnetic unit 14 and the second fixed magnetic unit 16 is shorter than the spin relaxation length $\lambda n$ of the nonmagnetic unit 10. Therefore, the spin accumulation in the nonmagnetic unit 10 between the first contact surface and the second contact surface occurs substantially uniformly regardless of the location between the first contact surface and the second contact surface.

The free magnetic unit 12 electrically contacts the nonmagnetic unit 10; but another external electrode does not contact the free magnetic unit 12. Therefore, between the free magnetic unit 12 and the nonmagnetic unit 10, a current does not flow; and only the transport of a spin current occurs. Here, "external electrode" means an electrode other than the nonmagnetic unit 10 that applies a voltage to the free magnetic unit 12 or causes a current to flow in the free magnetic unit 12.

As a result of diligent investigations by the inventors, it was found that the electrical resistance between the first fixed magnetic unit 14 and the second fixed magnetic unit 16 is affected by the magnetization direction of the free magnetic unit 12 in the case where spin mixing conductance exists at the contact surface between the free magnetic unit 12 and the nonmagnetic unit 10. In other words, for an angle $\theta$ between the magnetization direction of the first fixed magnetic unit 14 and the magnetization direction of the free magnetic unit 12, the resistance value is largest when $\theta$ is 0 degrees or 180 degrees; and the resistance value is smallest when $\theta$ is 90 degrees.

When $\theta$ is 0 degrees or 180 degrees, the effect of the spin mixing at the contact surface between the free magnetic unit 12 and the nonmagnetic unit 10 is small. Therefore, the electrical resistance is high between the first fixed magnetic unit 14 and the second fixed magnetic unit 16 which have magnetizations that are antiparallel to each other. Conversely, when $\theta$ is 90 degrees, a large spin mixing effect occurs; and the spin of the nonmagnetic unit 10 mixes. Therefore, the electrical resistance between the first fixed magnetic unit 14 and the second fixed magnetic unit 16 is lower than when 8 is 0 degrees or 180 degrees.

As described above, the electrical resistance between the first fixed magnetic unit 14 and the second fixed magnetic unit 16 is a function of $\theta$. By measuring the electrical resistance between the first fixed magnetic unit 14 and the second fixed magnetic unit 16, the value of $\theta$ can be known. For example, the value of $\theta$ can be known by the current source causing a sense current to flow between the first fixed magnetic unit 14 and the second fixed magnetic unit 16 and by sensing the voltage between the first fixed magnetic unit 14 and the second fixed magnetic unit 16.

A larger spin accumulation and a larger output can be obtained by setting the spin relaxation length $\lambda n$ of the nonmagnetic unit 10 to be as long as possible. To this end, it is desirable for a material having a long spin relaxation length such as Cu, Ag, or Au to be used as the material of the nonmagnetic unit 10.

It is desirable for materials having a large difference between the majority carrier resistivity $\rho^+$ and the minority carrier resistivity $\rho^-$ such as CoFe or CoFeB to be used as the materials of the free magnetic unit 12, the first fixed magnetic unit 14, and the second fixed magnetic unit 16. It is more desirable to use a half-metal in which majority carriers exist but minority carriers substantially do not exist. A Heusler alloy such as $Co_2Fe(Ge_{0.5}Ga_{0.5})$, $Co_2Mn(Ge_{0.5}Ga_{0.5})$, etc., may be used as the half-metal; and other materials that are half-metals may be used.

The nonmagnetic unit 10 may include a tunneling barrier layer in at least one of the region contacting the free magnetic unit 12, the region contacting the first fixed magnetic unit 14, or the region contacting the second fixed magnetic unit 16. For example, aluminum oxide or magnesium oxide having a thickness of 1 nm or less may be used as the tunneling barrier layer.

The resistance change between the terminals can be increased by setting the spin mixing conductance to be larger than the electrical conductance at the contact surface between the free magnetic unit 12 and the nonmagnetic unit 10. To this end, an insulating magnetic body such as yttrium iron garnet (YIG) may be used as the material of the free magnetic unit 12.

The spin-valve element 1 may include an antiferromagnetic unit contacting the first fixed magnetic unit 14 and an antiferromagnetic unit contacting the second fixed magnetic unit 16. The antiferromagnetic units respectively pin the magnetization directions of the first fixed magnetic unit 14 and the second fixed magnetic unit 16 securely by providing a unidirectional anisotropy to the first fixed magnetic unit 14 and the second fixed magnetic unit 16. PtMn, IrMn, etc., may be used as the materials of the antiferromagnetic units.

The first fixed magnetic unit 14 and the second fixed magnetic unit 16 may have so-called synthetic structures in which a nonmagnetic layer such as Ru, etc., is included and magnetic layers are antiferromagnetically coupled to each other with the nonmagnetic layer interposed. By using the synthetic structure, it is possible to perform the magnetization pinning more securely. In such a case, the magnetization direction of the magnetic layer that is included in the first fixed magnetic unit 14 and contacts the nonmagnetic unit 10 is opposite to the magnetization direction of the magnetic layer that is included in the second fixed magnetic unit 16 and contacts the nonmagnetic unit 10.

The distance between the free magnetic unit 12 and an end portion 10a in the first direction of the nonmagnetic unit 10 is shorter than the distance between the end portion 10a and the first fixed magnetic unit 14 and the distance between the end portion 10a and the second fixed magnetic unit 16. According to such a configuration, the sensing of the magnetic field is easy when the end portion 10a is moved to be proximal to an object and the magnetic field is sensed.

In the example shown in FIG. 1, the surface of the end portion 10a and the end surface in the first direction of the free magnetic unit 12 exist in the same surface. In other words, the surface of the end portion 10a and the end surface in the first direction of the free magnetic unit 12 are formed to be coplanar. According to such a configuration, it is possible to sense the external magnetic field with higher sensitivity when the end portion 10a is moved to be proximal to the object and the external magnetic field is sensed.

Or, the end surface in the first direction of the free magnetic unit 12 may be positioned on the first-direction side of the end surface in the first direction of the nonmagnetic unit 10.

A spin-valve element having four terminals is a comparative example of the embodiment.

The spin-valve element having four terminals includes a nonmagnetic unit extending in the first direction, a fixed magnetic unit provided on the nonmagnetic unit, and a free magnetic unit provided on the nonmagnetic unit. A first terminal and a second terminal are provided at two ends of the nonmagnetic unit. In the case where a first end portion, the fixed magnetic unit, the free magnetic unit, and a second end portion are arranged in order in the first direction, a current source is connected between the fixed magnetic unit and the first end portion of the nonmagnetic unit in the first direction. A voltmeter is connected between the free magnetic unit and the second end portion of the nonmagnetic unit on the side opposite to the first end portion.

Although a sense current is caused to flow between the nonmagnetic unit and the fixed magnetic unit, the electrical resistance inside a magnetic body is different due to the majority-spin electrons and the minority-spin electrons. Therefore, a spin-polarized current also flows in the nonmagnetic unit; and the electrochemical potential of the conduction electrons inside the nonmagnetic unit has different values for the spin-up electrons and the spin-down electrons.

For example, in the case where the nonmagnetic unit is set to 0 V and a positive voltage is applied to the fixed magnetic unit, a spin-up current $I\uparrow$ and a spin-down current $I\downarrow$ flow into the nonmagnetic unit from the fixed magnetic unit. The difference ($\mu\uparrow - \mu\downarrow$) between the electrochemical potentials that are generated has a maximum value at the position of the contact surface of the spin injection electrode and relaxes to zero away from the contact surface. In other words, the relaxation occurs exponentially with distance so that the electrochemical potential $\mu\uparrow$ of the spin-up electrons and the electrochemical potential $\mu\downarrow$ of the spin-down electrons become the same value.

Due to the fixed magnetic unit, the spin-up current $I\uparrow$ and the spin-down current $I\downarrow$ flow in reverse directions on the second end portion side. Therefore, the current (equal to $I\uparrow - I\downarrow$) that is the sum of the spin-up current $I\uparrow$ and the spin-down current $I\downarrow$ becomes zero; and a current does not flow. However, the spin current defined by $I\uparrow - I\downarrow$ flows.

The free magnetic unit electrically contacts the nonmagnetic unit; and because a spin relaxation length $\lambda f$ inside a magnetic body generally is extremely short, i.e., about several nm to 10 nm, the spin-up electrons and the spin-down electrons are in a shorted state inside the magnetic body; and the relaxation occurs rapidly. In other words, the spin-down electrons of the nonmagnetic unit flow into the free magnetic unit; and the spin-up electrons of the free magnetic unit flow out into the nonmagnetic unit.

In the case where the free magnetic unit is magnetized, the majority carrier resistivity $\rho^+$ and the minority carrier resistivity $\rho^-$ of the free magnetic unit have different values. Therefore, the voltage to which the electrochemical potential relaxes in the free magnetic unit is different between the case where the magnetizations of the fixed magnetic unit and the free magnetic unit are parallel to each other and the case where the magnetizations are antiparallel. For example, the sign of the potential difference between the free magnetic unit and the nonmagnetic unit is reversed between the case where the magnetization direction of the free magnetic unit and the magnetization direction of the nonmagnetic unit are parallel and the case where the magnetization directions are antiparallel. Accordingly, it is possible to measure whether the two magnetizations are parallel or antiparallel by measuring the voltage.

In an element that utilizes the difference between $\mu\uparrow$ and $\mu\downarrow$ due to the spin accumulation of the nonmagnetic unit, a larger spin accumulation of the nonmagnetic unit at the contact surface between the nonmagnetic unit and the free magnetic unit makes it possible to obtain a larger sense output. Therefore, it is desirable for the spin relaxation length of the nonmagnetic unit to be as long as possible; and it is desirable for the distance between the fixed magnetic unit and the free magnetic unit to be as short as possible.

On the other hand, as a result of detailed investigations of the electrochemical potential of the nonmagnetic unit, it was found that for the electrochemical potential of the nonmagnetic unit in such a spin-valve element having four terminals, the spin accumulation does not relax until a distance of about the spin relaxation length $\lambda n$ from the contact position between the fixed magnetic unit and the nonmagnetic unit. Therefore, it was found that a larger spin accumulation can be obtained by setting the position of the terminal of the nonmagnetic unit to be a distance of about the spin relaxation length $\lambda n$ from the contact position between the fixed magnetic unit and the nonmagnetic unit. In the case of a heterogeneous structure in which an external lead terminal is connected at a distance that is shorter than the spin relaxation length λn or in the case where a material having a short spin relaxation length is used, the spin relaxation is undesirably promoted. Therefore, the spin accumulation becomes small; and a sufficient sense output may not be obtained.

For the electrochemical potential of the nonmagnetic unit, the spin accumulation is not relaxed and μ↑ does not equal μ↓ until several times the spin relaxation length λn from the contact position between the fixed magnetic unit and the nonmagnetic unit. Therefore, it was found that it is desirable for the position of the terminal of the nonmagnetic unit to be several times the spin relaxation length λn from the contact position between the fixed magnetic unit and the nonmagnetic unit. In the case of a heterogeneous structure in which the external lead terminal is connected at a distance that is shorter than several times the spin relaxation length λn or in the case where a material having a short spin relaxation length is used, the spin relaxation is thereby promoted, which may cause noise and a decrease of the spin accumulation.

Thus, in the spin-valve element having four terminals, it was found that it is necessary to set the nonmagnetic unit to be sufficiently longer than the spin relaxation length λn; and it is necessary for the size of the entire spin-valve element to have a length of several μm. Therefore, there is a possibility that the degrees of freedom of the design of the device using the spin-valve element may be undesirably limited. If nonuniformities or defects occur somewhere in the several μm of the nonmagnetic unit or if an external lead terminal undesirably contacts a location within the several μm, the spin accumulation is undesirably affected; and the output characteristics undesirably degrade. Accordingly, it was found that the element is easily affected by disturbance and is difficult to make.

A spin-valve element that has three terminals such as that of non-patent document 1 is another comparative example of the embodiment.

In non-patent document 1, the three-terminal structure does not go beyond a theoretical investigation. In the three-terminal structure, a magnetic body 1, a magnetic body 2, and a magnetic body 3 are connected by a nonmagnetic node; and the electrochemical potentials of the magnetic body 1, the magnetic body 2, and the magnetic body 3 are controlled respectively by external terminals. Among the magnetic bodies, a potential difference V is applied between the magnetic body 1 and the magnetic body 2; and the magnetizations of the magnetic bodies 1 and 2 are antiparallel to each other.

Conversely, the direction of the magnetization of the magnetic body 3 can be changed; and the electrochemical potential of the magnetic body 3 is controlled by the external terminal so that a current does not flow between the magnetic body 3 and the nonmagnetic body.

In such a case, spin mixing conductance exists at the bonding surface between the nonmagnetic body and the magnetic body 3. Therefore, it is predicted that the electrical resistance between the magnetic body 1 and the magnetic body 2 will be affected by the angle between the magnetization direction of the magnetic body 3 and the magnetization directions of the magnetic bodies 1 and 2. In other words, for an angle θ3 defined as the angle between the magnetization direction of the magnetic body 1 and the magnetization direction of the magnetic body 3, it is predicted that the resistance will be largest when θ3 is 0 degrees or 180 degrees and smallest when θ3 is 90 degrees.

In this configuration, the number of terminals is one less than the four-terminal structure. However, this does not go beyond the stage of a theoretical study; and there is absolutely no description of a specific configuring method for making a spin-valve element, a hard disk head, etc.

In non-patent document 1, the node that connects the three magnetic bodies is not described beyond a conceptual existence; and no specific method is proposed for the use in a spin-valve element or a hard disk head.

Further, currently, the giant magnetoresistance effect elements and the tunneling magnetoresistance effect elements that are used in hard disk heads are two-terminal elements; and therefore, the structure having one extra terminal is not applicable as-is to current head manufacturing technology. Therefore, the number of new development topics increases; a more complex structure is unavoidable; and therefore, the yield degrades and the manufacturing cost increases.

Conversely, in the spin-valve element 1 according to the embodiment, the first fixed magnetic unit 14 and the second fixed magnetic unit 16 are connected to the current source and the voltage sensor using two terminals; and the magnetization direction of the free magnetic unit 12 is sensed by utilizing the spin mixing conductance at the contact surface between the free magnetic unit 12 and the nonmagnetic unit 10. Therefore, to provide a large spin mixing conductance at the contact surface between the free magnetic unit 12 and the nonmagnetic unit 10, it is desirable to use a tunnel junction, an oxide magnet, or a high-resistance magnet such as yttrium iron garnet (YIG) as the magnetic body.

In particular, a major feature of the invention is that the free magnetic unit 12 is a micro magnetic body that is not connected to an external electrode. Thus, by using a micro free magnetic unit 12, it is possible to prevent current from flowing into the free magnetic unit by utilizing the increase of the voltage of the free magnetic unit 12 that occurs when a current flows in from the nonmagnetic body. A charge current is prevented from flowing into the free magnetic unit 12; a spin current can flow in because the spin current has no charge; and the spin mixing effect occurs thereby. Therefore, it is unnecessary to control the voltage by connecting a voltage control terminal to the free magnetic unit 12; and a two-terminal element is possible. In other words, this is the first case where operations as a two-terminal element are possible in which a micro free magnetic unit 12 is used and the flow of current to and from the outside is prevented. As a result of diligent investigations, it was found that the spin mixing effect can be utilized effectively because the spin current flows even in such a case. It is desirable for the free magnetic unit 12 to be small because the spatial resolution as a magnetic field sensor increases as the size of the free magnetic unit 12 decreases. Because it is desirable for the maximum length of the contact surface between the free magnetic unit 12 and the nonmagnetic unit 10 to be sufficiently smaller than the spin diffusion length of the nonmagnetic unit 10, it is desirable for the maximum length of the contact surface to be 400 nm or less which is the general spin diffusion length of the nonmagnetic body. It is more desirable for the size of the free magnetic unit 12 to be 40 nm or less which is 1/10 of 400 nm. In the case where the thickness of the free magnetic unit 12, i.e., the length in a direction orthogonal to the contact surface between the free magnetic unit 12 and the nonmagnetic unit 10, is set to be not less than 3 times the spin diffusion length inside the magnetic body, the stored charge easily becomes nonuniform; and a current undesirably flows easily. Therefore, it is desirable for the thickness of the free magnetic unit 12 to be 100 nm or less, and more desirable to be 10 nm or less which is 1/10 of 100 nm.

Because it is desirable for the distance between the free magnetic unit 12 and the first fixed magnetic unit 14 and the distance between the free magnetic unit 12 and the second fixed magnetic unit 16 to be sufficiently smaller than the spin diffusion length of the nonmagnetic unit, it is desirable for the distances to be 400 nm or less, and more desirable to be 40 nm or less which is 1/10 of 400 nm. Here, the distance between the magnetic bodies means the shortest distance between the magnetic bodies.

Because it is unnecessary to use a long nonmagnetic unit in the spin-valve element 1 as in the spin-valve element having four terminals described above, it is possible to increase the degrees of freedom of the design of the device in which the spin-valve element 1 is used.

Unlike the spin-valve element having four terminals described above, the spin-valve element 1 is operable using only two terminals and is compact; and therefore, the construction is easy, and it is possible to increase the yield and the productivity.

Second Embodiment

A spin-valve element 2 according to a second embodiment will now be described using FIG. 2 and FIG. 3.

Figure 2:
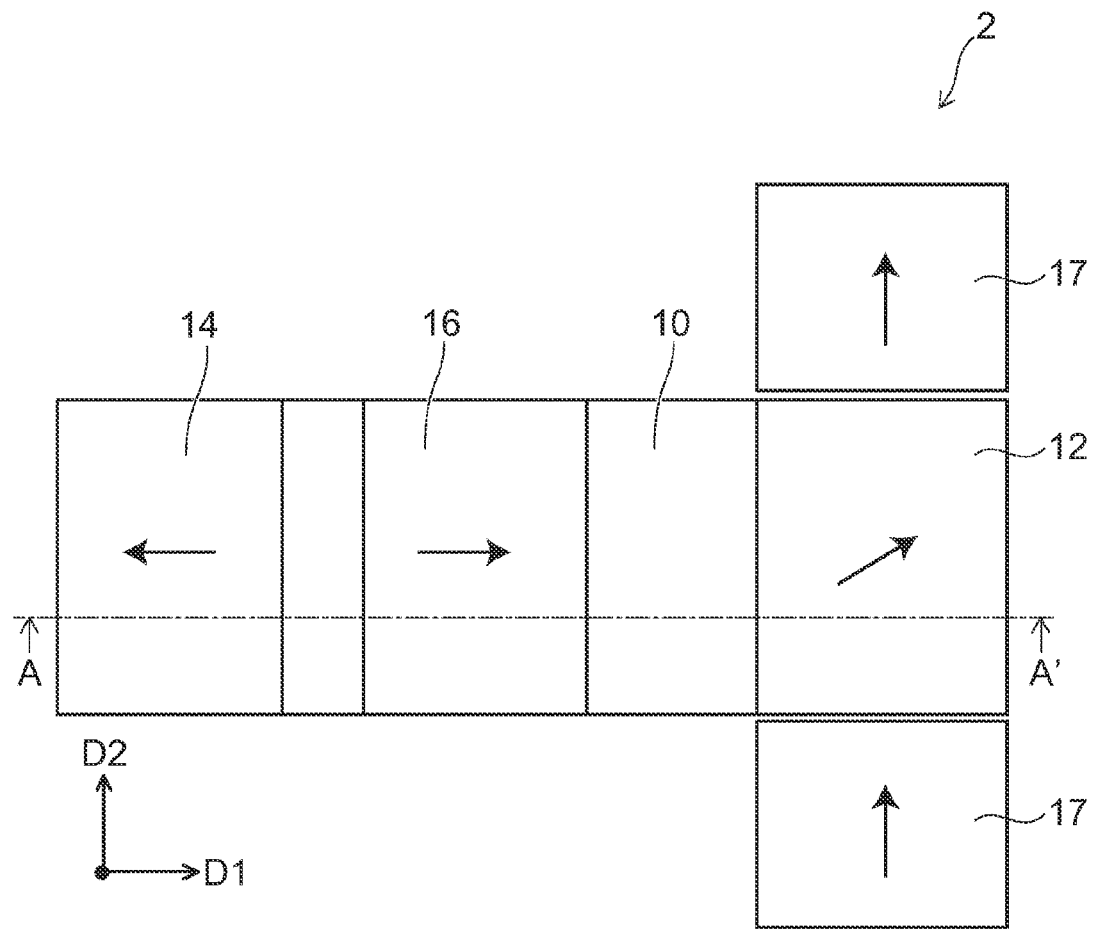
FIG. 2 is a plan view of the spin-valve element according to the second embodiment.

FIG. 2 is a plan view of the spin-valve element 2 according to the second embodiment.

FIG. 3 is a cross-sectional view of the spin-valve element 2 according to the second embodiment.

FIG. 3 is an A-A' cross-sectional view of FIG. 2.

The spin-valve element 2 differs from the spin-valve element 1 in that the spin-valve element 2 includes hard bias units 17.

The hard bias units 17 apply a magnetic field to the free magnetic unit 12 in a second direction intersecting the magnetization direction of the first fixed magnetic unit 14 and the magnetization direction of the second fixed magnetic unit 16. Here, the second direction is taken to be a direction orthogonal to the first direction. When there is no external magnetic field other than that of the hard bias units 17, it is favorable for the magnetization direction of the free magnetic unit 12 to have an angle of 45 degrees from the magnetization direction of the first fixed magnetic unit 14 and the magnetization direction of the second fixed magnetic unit 16. This is because the resistance value changes most when the magnetization direction of the free magnetic unit 12 is in the vicinity of 45 degrees from the magnetization direction of the first fixed magnetic unit 14 and the magnetization direction of the second fixed magnetic unit 16. Accordingly, it is possible to sense the direction of the external magnetic field with higher sensitivity when the external magnetic field is applied.

The second direction is, for example, a direction D2 shown in FIG. 2.

In the following description, the angle of the magnetization direction of the first fixed magnetic unit 14 is 180 degrees; the angle of the magnetization direction of the second fixed magnetic unit 16 is 0 degrees; and the angle of a direction orthogonal to the magnetization direction of the first fixed magnetic unit 14 and the magnetization direction of the second fixed magnetic unit 16 is 90 degrees.

For example, the magnetization direction of the free magnetic unit 12 can be set to 45 degrees by the spin torque due to the sense current while using the hard bias units 17 to apply a magnetic field in the second direction. The sense current is adjusted so that the magnetization direction of the free magnetic unit 12 is set to an angle of 45 degrees.

A modification of the spin-valve element 2 according to the second embodiment will now be described using FIG. 4.

FIG. 4 is a plan view of the modification of the spin-valve element 2 according to the second embodiment.

In the form shown in FIG. 4, the magnetization direction of the free magnetic unit 12 is set to 90 degrees by using the hard bias units 17 to apply a large magnetic field to the free magnetic unit 12. The first fixed magnetic unit 14 and the second fixed magnetic unit 16 are magnetized in directions of 45 degrees. Accordingly, the relative angle between the magnetization direction of the free magnetic unit 12 and the magnetization direction of the first fixed magnetic unit 14 and the relative angle between the magnetization direction of the free magnetic unit 12 and the magnetization direction of the second fixed magnetic unit 16 are 45 degrees. At this time, the magnetic field that is applied from the hard bias units 17 is such that the magnetization direction of the free magnetic unit 12 does not change due to the spin torque from the sense current.

Third Embodiment

A spin-valve element 3 according to a third embodiment will now be described using FIG. 5.

Figure 5:
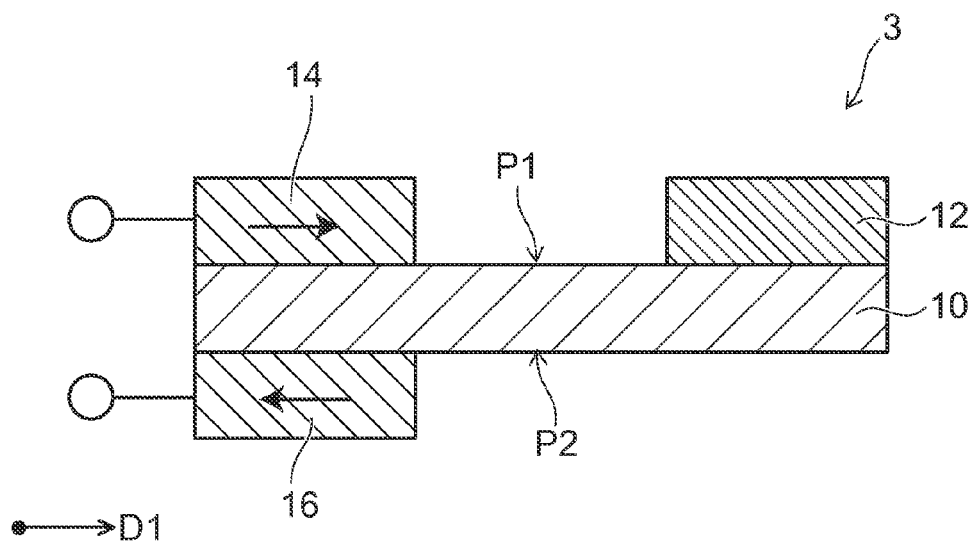
FIG. 5 is a cross-sectional view of the spin-valve element according to the third embodiment.

FIG. 5 is a cross-sectional view of the spin-valve element 3 according to the third embodiment.

The spin-valve element 3 differs from the spin-valve element 1 in that the second fixed magnetic unit 16 is provided on a second surface P2 opposing the surface P1.

At least a portion of the second fixed magnetic unit 16 may oppose the first fixed magnetic unit 14 with the nonmagnetic unit 10 interposed.

Compared to the spin-valve element 1, it is possible for the length in the first direction of the nonmagnetic unit 10 to be shorter by at least a portion of the second fixed magnetic unit 16 opposing the first fixed magnetic unit 14 with the nonmagnetic unit 10 interposed. Therefore, the spin capacitance of the nonmagnetic unit 10 decreases; and it is possible to improve the output when sensing the external magnetic field.

Fourth Embodiment

A spin-valve element 4 according to a fourth embodiment will now be described using FIG. 6.

Figure 6:
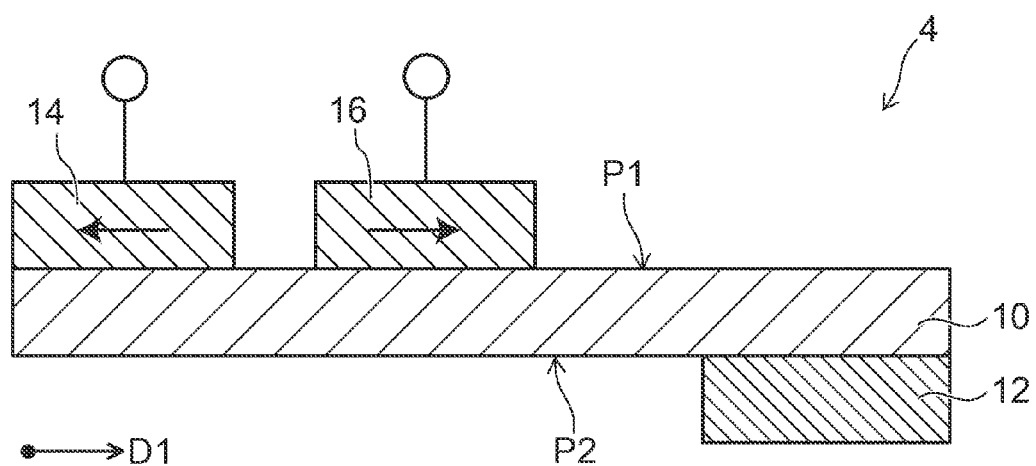
FIG. 6 is a cross-sectional view of the spin-valve element according to the fourth embodiment.

FIG. 6 is a cross-sectional view of the spin-valve element 4 according to the fourth embodiment.

The spin-valve element 4 differs from the spin-valve element 1 in that the free magnetic unit 12 is provided on the surface P2.

According to such a configuration, compared to the spin-valve element 1, it is possible to provide the first fixed magnetic unit 14 and the second fixed magnetic unit 16 at positions that are more proximal to the free magnetic unit 12.

Fifth Embodiment

A spin-valve element 5 according to a fifth embodiment will now be described using FIG. 7.

Figure 7:
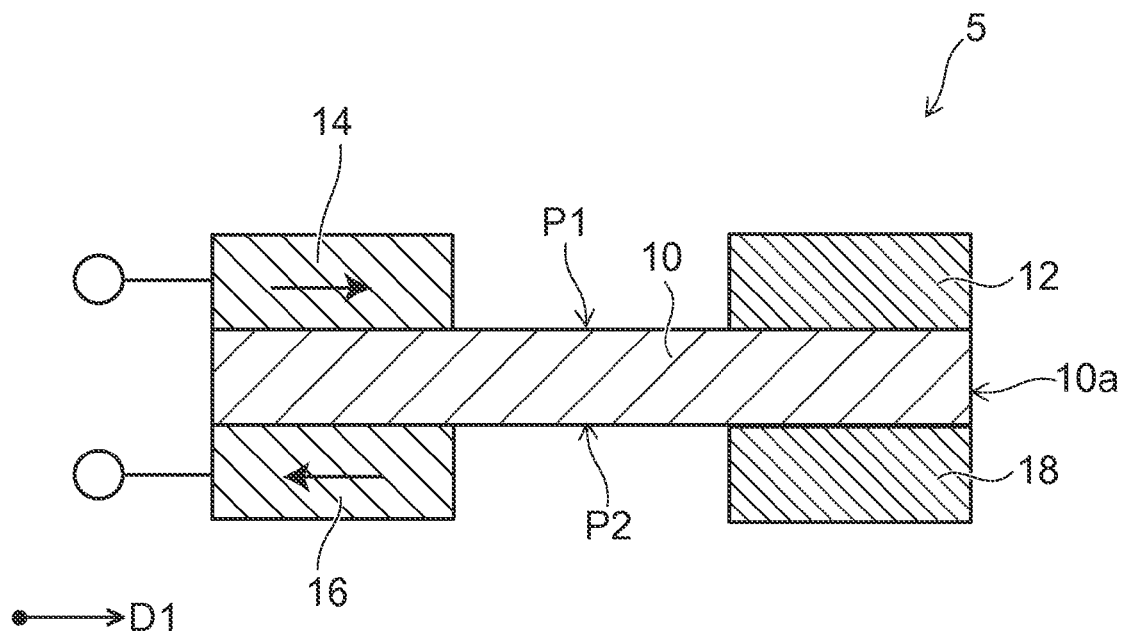
FIG. 7 is a cross-sectional view of the spin-valve element 5 according to the fifth embodiment.

FIG. 7 is a cross-sectional view of the spin-valve element 5 according to the fifth embodiment.

The spin-valve element 5 differs from the spin-valve element 1 in that a second free magnetic unit (a fourth magnetic unit) 18 that is provided on the surface P2 is included in addition to the first free magnetic unit 12 that is provided on the surface P1.

In the spin-valve element 5, the magnetization direction of the first fixed magnetic unit 14 and the magnetization direction of the second fixed magnetic unit 16 are antiparallel. Therefore, spin accumulation occurs at both the first contact surface between the first fixed magnetic unit 14 and the nonmagnetic unit 10 and the second contact surface between the second fixed magnetic unit 16 and the nonmagnetic unit 10 so that the spin-up current μ↑ becomes large. The distance between the first fixed magnetic unit 14 and the second fixed magnetic unit 16 is sufficiently short compared to the spin relaxation length λn of the nonmagnetic unit 10. Therefore, the spin accumulation in the nonmagnetic unit 10 between the first contact surface and the second contact surface occurs substantially uniformly regardless of the location between the first contact surface and the second contact surface.

The following results were found by diligent investigations of the inventors.

In the case where the first free magnetic unit 12 electrically contacts the nonmagnetic unit 10 but is not connected to an external electrode, a current does not flow between the first free magnetic unit 12 and the nonmagnetic unit 10; and only the transport of a spin current occurs between the first free magnetic unit 12 and the nonmagnetic unit 10. Even in such a case, if spin mixing conductance exists at the contact interface between the first free magnetic unit 12 and the nonmagnetic unit 10, the electrical resistance between the first fixed magnetic unit 14 and the second fixed magnetic unit 16 is affected by the magnetization direction of the first free magnetic unit 12.

In the case where the second free magnetic unit 18 electrically contacts the nonmagnetic unit 10 but is not connected to an external electrode, a current does not flow between the second free magnetic unit 18 and the nonmagnetic unit 10; and only the transport of a spin current occurs between the second free magnetic unit 18 and the nonmagnetic unit 10. Even in such a case, if spin mixing conductance exists at the contact interface between the second free magnetic unit 18 and the nonmagnetic unit 10, the electrical resistance between the first fixed magnetic unit 14 and the second fixed magnetic unit 16 is affected by the magnetization direction of the second free magnetic unit 18.

In such a case, the effects from the first free magnetic unit 12 and the second free magnetic unit 18 are summed. As a specific example, the angle of the magnetization direction of the first fixed magnetic unit 14 is taken to be 0 degrees; the angle of the magnetization direction of the second fixed magnetic unit 16 is taken to be 180 degrees; the angle of the magnetization direction of the first free magnetic unit 12 is an angle θA; and the angle of the magnetization direction of the second free magnetic unit 18 is an angle θB.

First, in the state in which there is no external magnetic field, a magnetic field is applied so that θA is substantially 45 degrees and θB is substantially 135 degrees. In other words, in the state in which there is no external magnetic field, the setting is such that θB-θA is substantially 90 degrees.

In such a case, when external magnetic fields having the same magnitude are applied to the first free magnetic unit 12 and the second free magnetic unit 18 in the direction of 0 degrees, both of the magnetizations rotate so that θA and θB decrease by the same amount to the direction of 0 degrees; and θB-θA does not change. In other words, the magnetization direction of the first free magnetic unit 12 moves in the direction of increasing the electrical resistance between the first fixed magnetic unit 14 and the second fixed magnetic unit 16; and the magnetization direction of the second free magnetic unit moves in the direction of reducing the electrical resistance between the first fixed magnetic unit 14 and the second fixed magnetic unit 16. Accordingly, the sum effect is canceled; and the electrical resistance does not change.

Similarly, when external magnetic fields having the same magnitude are applied to the first free magnetic unit 12 and the second free magnetic unit 18 in the direction of 180 degrees as well, θB-θA does not change; and the electrical resistance does not change.

Conversely, when magnetic fields are applied to the first free magnetic unit in the direction of 0 degrees and to the second free magnetic unit in the reverse direction of 180 degrees, the electrical resistance becomes large as an entirety because θB-θA increases and both magnetic fields act in directions to increase the electrical resistance.

Conversely, when magnetic fields are applied to the first free magnetic unit in the direction of 180 degrees and to the second free magnetic unit in the direction of 0 degrees, θB-θA becomes small; and the electrical resistance as an entirety becomes small because both magnetic fields act in directions to reduce the electrical resistance.

Thus, the electrical resistance between the first fixed magnetic unit 14 and the second fixed magnetic unit 16 is a function of θB-θA. The value of θB-θA can be known by measuring the electrical resistance.

Thus, in this configuration, it is possible to obtain a higher resolution because a differential operation for the external magnetic fields is performed.

To perform the operations described above favorably, it is desirable for the characteristics of the first free magnetic unit 12 to match the characteristics of the second free magnetic unit 18. Accordingly, it is desirable for the materials, the film thicknesses, the positional relationships with the first fixed magnetic unit 14 and the second fixed magnetic unit 16, the contact surface areas with the nonmagnetic unit 10, the volumes, etc., to be the same between the first free magnetic unit 12 and the second free magnetic unit 18.

Accordingly, in the spin-valve element 5, at least a portion of the second free magnetic unit 18 opposes the first free magnetic unit 12 with the nonmagnetic unit 10 interposed. The distance between the first free magnetic unit 12 and the end portion 10a in the first direction of the nonmagnetic unit 10 is shorter than the distance between the end portion 10a and the first fixed magnetic unit 14 and the distance between the end portion 10a and the second fixed magnetic unit 16. The distance between the end portion 10a and the second free magnetic unit 18 is shorter than the distance between the end portion 10a and the first fixed magnetic unit 14 and the distance between the end portion 10a and the second fixed magnetic unit 16. The material of the second free magnetic unit 18 is the same as the material of the first free magnetic unit 12.

A material similar to that of the first free magnetic unit 12 may be included in the second free magnetic unit 18.

In the spin-valve element 5 shown in FIG. 7, the first fixed magnetic unit 14 is provided on the surface P1; and the second fixed magnetic unit 16 is provided on the surface P2. However, both the first fixed magnetic unit 14 and the second fixed magnetic unit 16 may be provided on one of the surface P1 or the surface P2.

According to the embodiment, similarly to the first embodiment, size reduction is possible; and a spin-valve element that is easy to make is provided.

According to the embodiment, the output when sensing the external magnetic fields can be larger than that of the first embodiment because the two free magnetic units, i.e., the first free magnetic unit 12 and the second free magnetic unit 18, are used.

Sixth Embodiment

A hard disk head 100 according to a sixth embodiment will now be described using FIG. 8 and FIG. 9.

Figure 8:
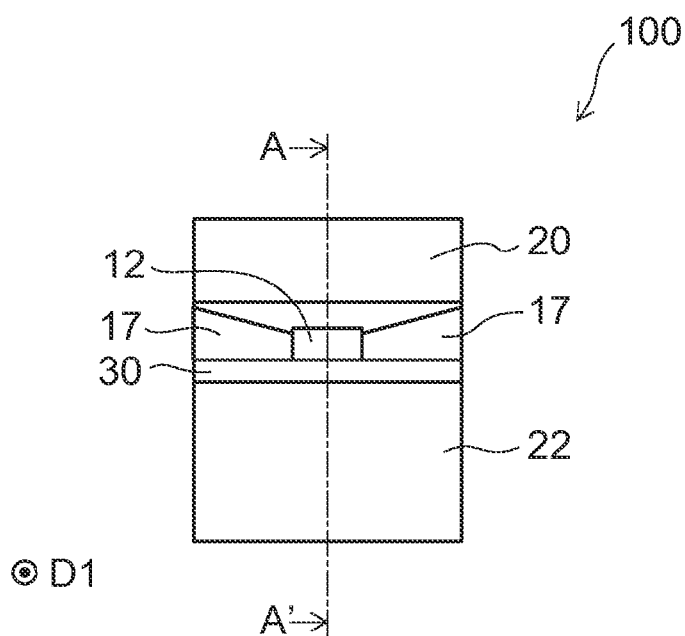
FIG. 8 is a front view showing the hard disk head according to the sixth embodiment.

FIG. 8 is a front view showing the hard disk head 100 according to the sixth embodiment.

Figure 9:
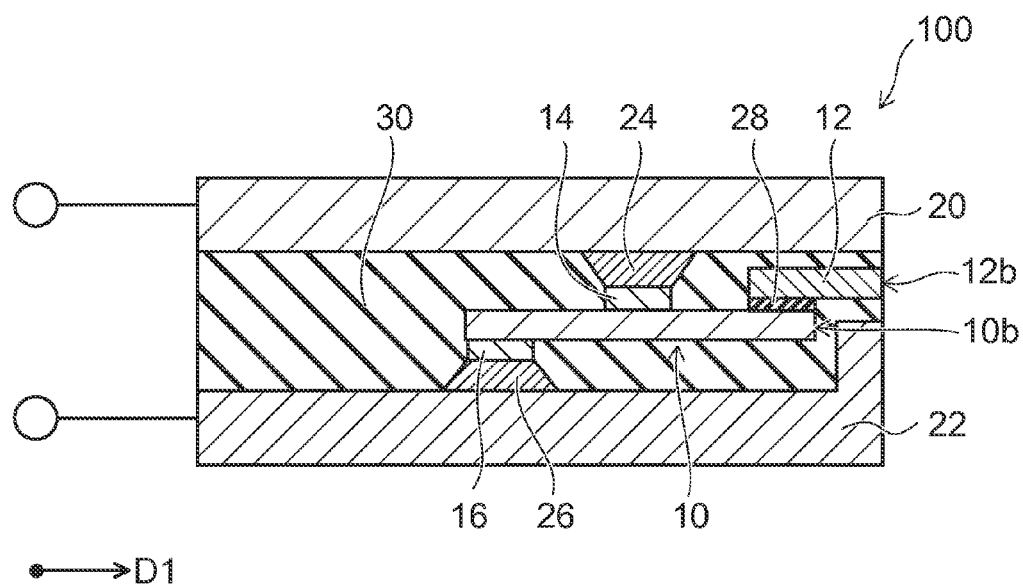
FIG. 9 is a cross-sectional view showing the hard disk head according to the sixth embodiment.

FIG. 9 is a cross-sectional view showing the hard disk head 100 according to the sixth embodiment.

FIG. 9 is an A-A' cross section of FIG. 8.

In the hard disk head 100, the spin-valve element according to the third embodiment is used as a magnetic sensor. The hard disk head 100 includes the spin-valve element, an upper magnetic shield 20, and a lower magnetic shield 22. The first fixed magnetic unit 14 and the second fixed magnetic unit 16 are provided on mutually-different surfaces of the nonmagnetic unit 10. According to such a structure, it is easy to electrically connect the first fixed magnetic unit 14 to the upper magnetic shield 20; and it is easy to electrically connect the second fixed magnetic unit 16 to the lower magnetic shield 22.

An antiferromagnetic unit 24 for fixing the magnetization direction of the first fixed magnetic unit 14 contacts the first fixed magnetic unit 14. A lead terminal is provided on the antiferromagnetic unit 24; and the antiferromagnetic unit 24 is connected to the upper magnetic shield 20. The upper magnetic shield 20 functions as an electrical interconnect and is connected to an external terminal.

An antiferromagnetic unit 26 for fixing the magnetization direction of the second fixed magnetic unit 16 contacts the second fixed magnetic unit 16. A lead terminal is provided on the antiferromagnetic unit 26; and the antiferromagnetic unit 26 is connected to the lower magnetic shield 22. The lower magnetic shield 22 functions as an electrical interconnect and is connected to an external terminal.

The first fixed magnetic unit 14 and the second fixed magnetic unit 16 may oppose each other with the nonmagnetic unit 10 interposed.

An insulator is provided around the free magnetic unit 12; and the free magnetic unit 12 is electrically insulated from the nonmagnetic unit 10 and the magnetic shields that are around the free magnetic unit 12. An end surface 12b in the first direction of the free magnetic unit 12 is positioned on the first-direction side of an end surface 10b in the first direction of the nonmagnetic unit 10.

The nonmagnetic unit 10 includes a tunneling barrier layer 28 at the contact surface between the nonmagnetic unit 10 and the free magnetic unit 12.

The end surface in the first direction of the free magnetic unit 12, the end surface in the first direction of the lower magnetic shield, and the end surface in the first direction of the upper magnetic shield are positioned in the same surface; and this surface is used as an ABS (Air Bearing Surface).

A current source and a voltmeter are connected to the upper magnetic shield and the lower magnetic shield. Thereby, a sense current flows between the first fixed magnetic unit 14 and the second fixed magnetic unit 16; the voltage between the first fixed magnetic unit 14 and the second fixed magnetic unit 16 is measured; and the resistance value is determined.

An insulator 30 is provided to prevent unnecessary electrical contact between the spin-valve element and the upper magnetic shield 20 and between the spin-valve element and the lower magnetic shield 22. For example, aluminum oxide is used as the insulator 30.

The spin-valve element according to the embodiment of the invention has a structure in which the fixed magnetic unit is distal to the ABS, and the free magnetic unit does not contact an external electrode. Accordingly, by using the spin-valve element in a hard disk head, it is possible to reduce the spacing between the upper magnetic shield 20 and the lower magnetic shield 22 at the ABS; and it is possible to increase the resolution when sensing the external magnetic field.

Seventh Embodiment

A hard disk head 200 according to a seventh embodiment will now be described using FIG. 10 and FIG. 11.

Figure 10:
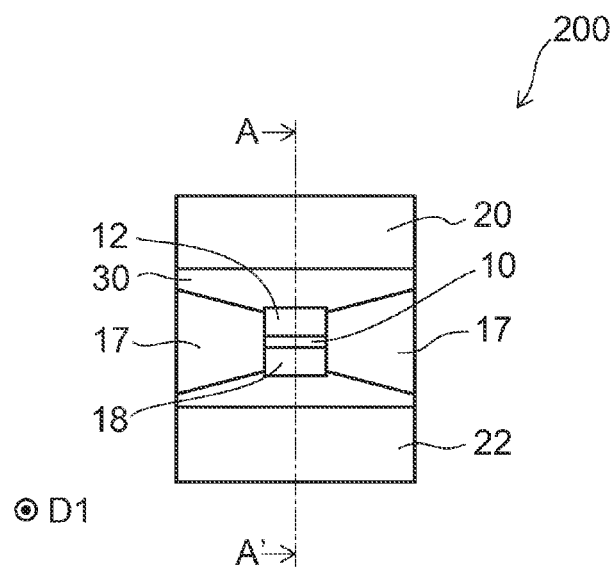
FIG. 10 is a front view showing the hard disk head according to the seventh embodiment.

FIG. 10 is a front view showing the hard disk head 200 according to the seventh embodiment.

Figure 11:
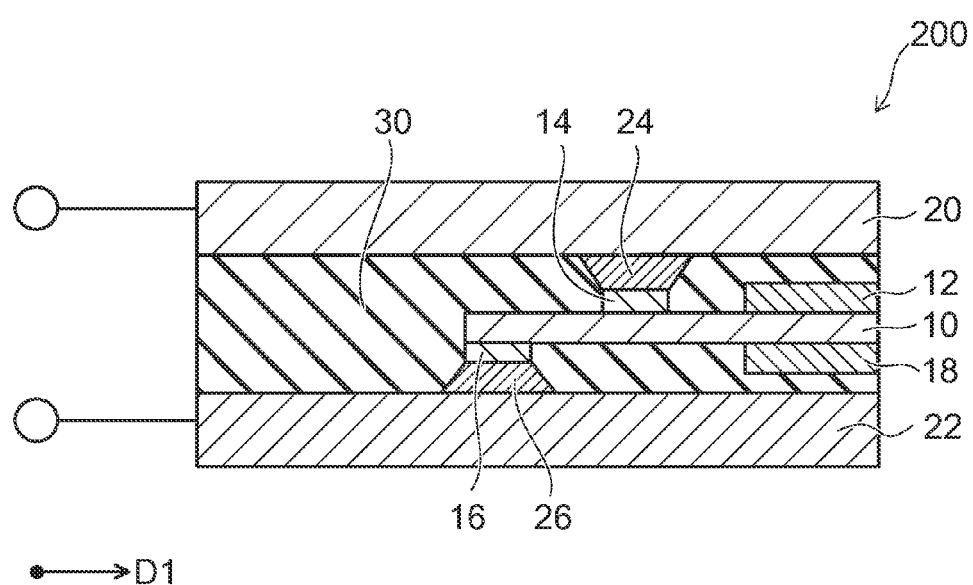
FIG. 11 is a cross-sectional view showing the hard disk head according to the seventh embodiment.

FIG. 11 is a cross-sectional view showing the hard disk head 200 according to the seventh embodiment.

FIG. 11 is an A-A' cross section of FIG. 10.

The hard disk head 200 differs from the hard disk head 100 in that the spin-valve element according to the fifth embodiment is used as the magnetic sensor. The hard disk head 200 includes the spin-valve element, the upper magnetic shield 20, and the lower magnetic shield 22.

Because the first fixed magnetic unit 14 and the second fixed magnetic unit 16 are provided on mutually-different surfaces of the nonmagnetic unit 10, the electrical connection between the first fixed magnetic unit 14 and the upper magnetic shield 20 and the electrical connection between the second fixed magnetic unit 16 and the lower magnetic shield 22 are easy.

The end surface in the first direction of the nonmagnetic unit 10, the end surface in the first direction of the first free magnetic unit 12, the end surface in the first direction of the second free magnetic unit 18, the end surface in the first direction of the upper magnetic shield 20, and the end surface in the first direction of the lower magnetic shield 22 exist in the same surface; and this surface is used as the ABS.

According to the embodiment, the linear resolution can be higher than that of the sixth embodiment because the output when sensing the external magnetic fields can be a differential output.

Eighth Embodiment

A hard disk head assembly 300 according to an eighth embodiment will now be described using FIG. 12 and FIG. 13.

Figure 12:
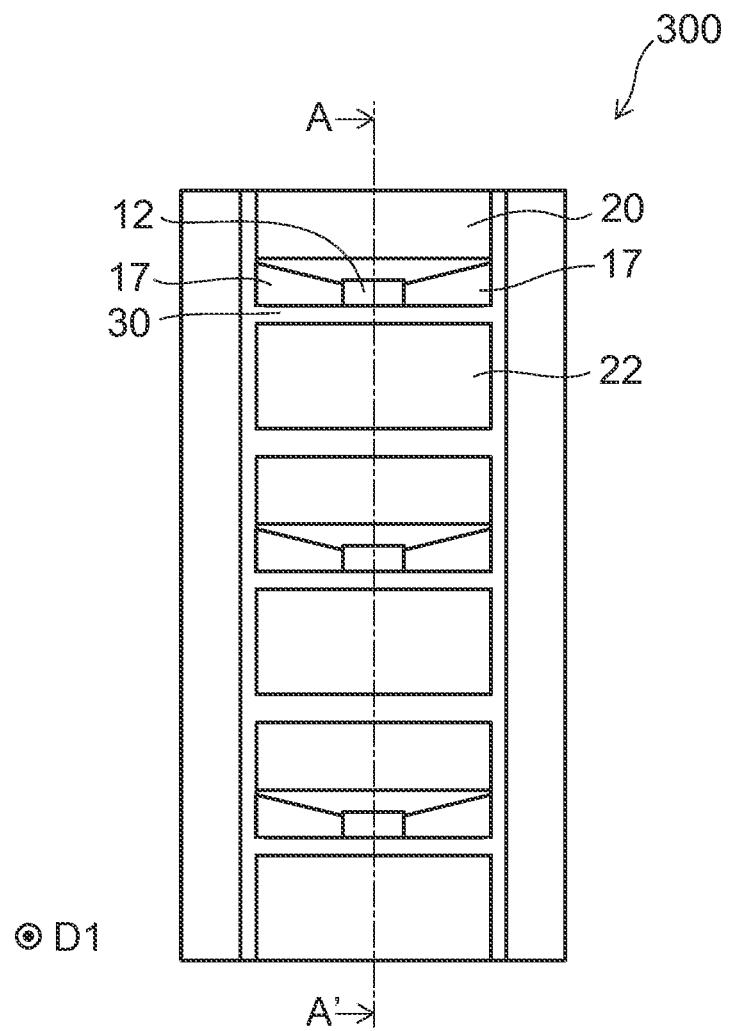
FIG. 12 is a front view showing the hard disk head assembly according to the eighth embodiment.

FIG. 12 is a front view showing the hard disk head assembly 300 according to the eighth embodiment.

Figure 13:
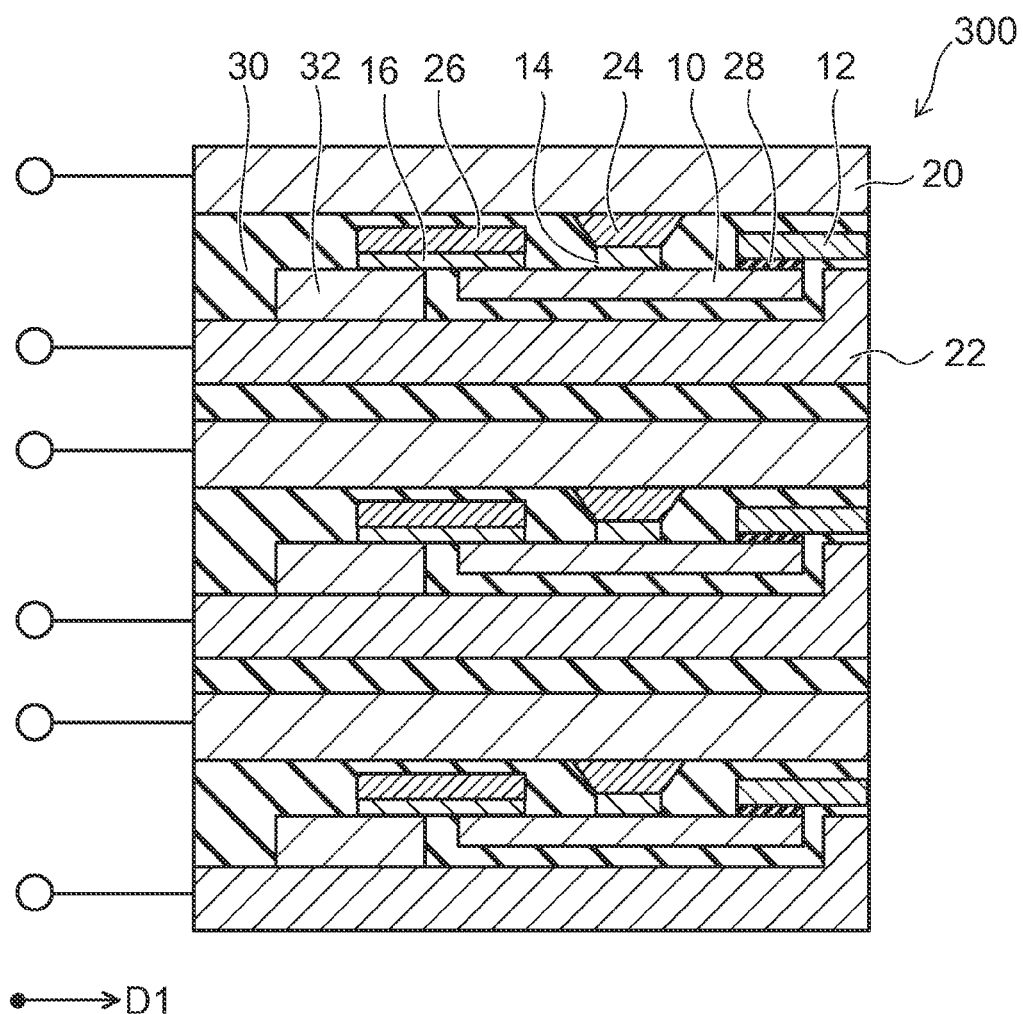
FIG. 13 is a cross-sectional view showing the hard disk head assembly according to the eighth embodiment.

FIG. 13 is a cross-sectional view showing the hard disk head assembly 300 according to the eighth embodiment.

FIG. 13 is an A-A' cross section of FIG. 12.

The hard disk head assembly 300 has a structure in which multiple hard disk heads are stacked in a direction from the lower magnetic shield 22 toward the upper magnetic shield 20.

The spin-valve element according to the first embodiment is used as the magnetic sensor in each of the hard disk heads. The hard disk head includes the spin-valve element, the upper magnetic shield 20, and the lower magnetic shield 22.

The first fixed magnetic unit 14 and the second fixed magnetic unit 16 are provided on the surface P1 of the nonmagnetic unit 10. The first fixed magnetic unit 14 is connected to the upper magnetic shield 20 via the antiferromagnetic unit 24. The second fixed magnetic unit 16 is connected to the lower magnetic shield 22 via the antiferromagnetic unit 26 and an electrode 32.

It is possible to reduce the spacing between the upper magnetic shield 20 and the lower magnetic shield 22 because the first fixed magnetic unit 14 and the second fixed magnetic unit 16 are provided on the same surface. Therefore, it is possible to stack the hard disk heads at a higher density.

The end surface in the first direction of the first free magnetic unit 12, the end surface in the first direction of the upper magnetic shield 20, and the end surface in the first direction of the lower magnetic shield 22 exist in the same surface; and this surface is used as the ABS.

The spin-valve element according to the embodiment of the invention has a structure in which the fixed magnetic units are distal to the ABS, and the free magnetic unit does not contact an external electrode. Accordingly, this aspect also is advantageous in the case where the hard disk heads are stacked at a higher density.

Ninth Embodiment

A magnetic recording and reproducing device 400 according to a ninth embodiment will now be described using FIG. 14 and FIGS. 15A and 15B.

Figure 14:
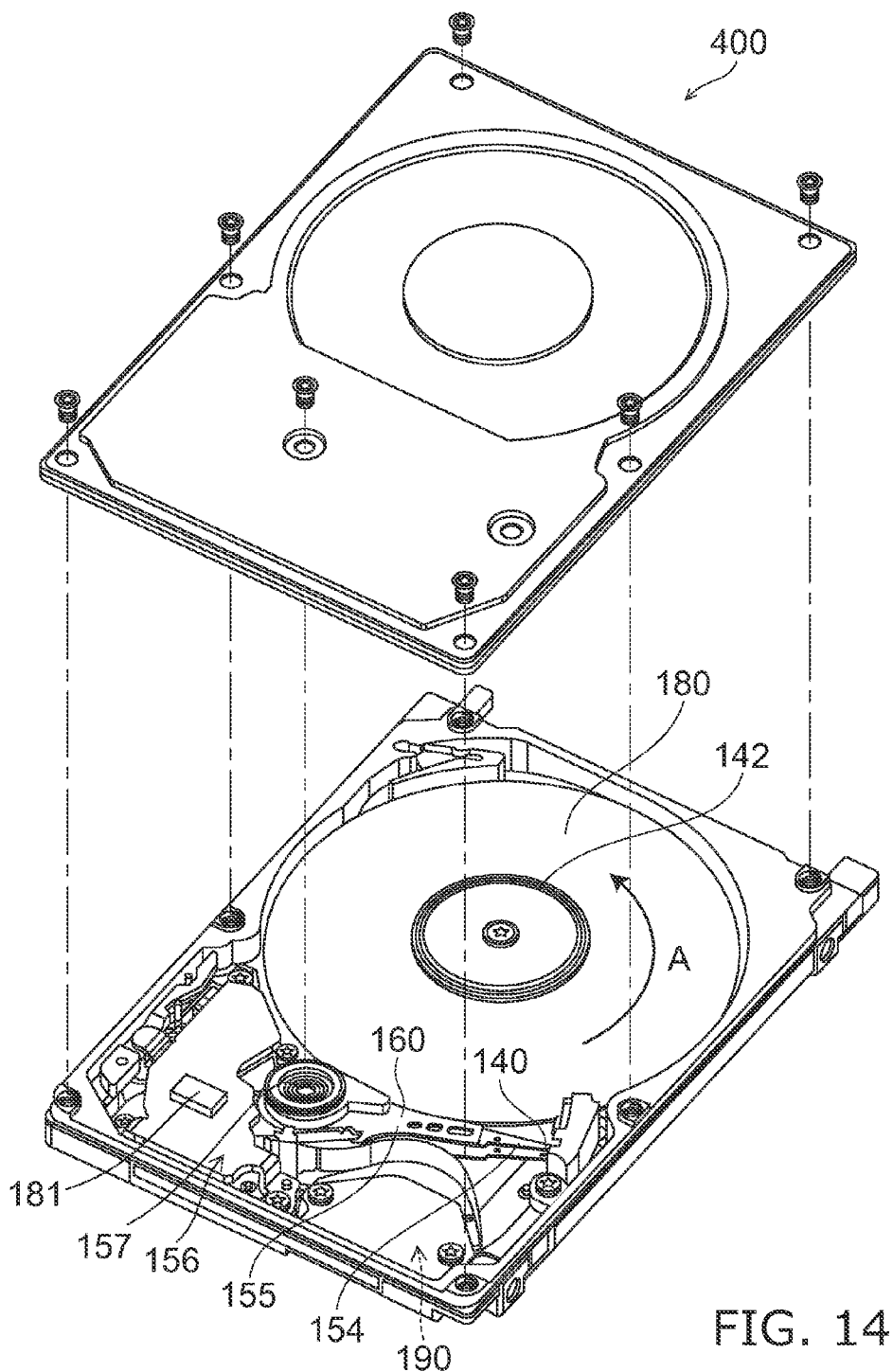
FIG. 14 is a perspective view showing the magnetic recording and reproducing device according to the ninth embodiment.

FIG. 14 is a perspective view showing the magnetic recording and reproducing device 400 according to the ninth embodiment.

Figure 15A:
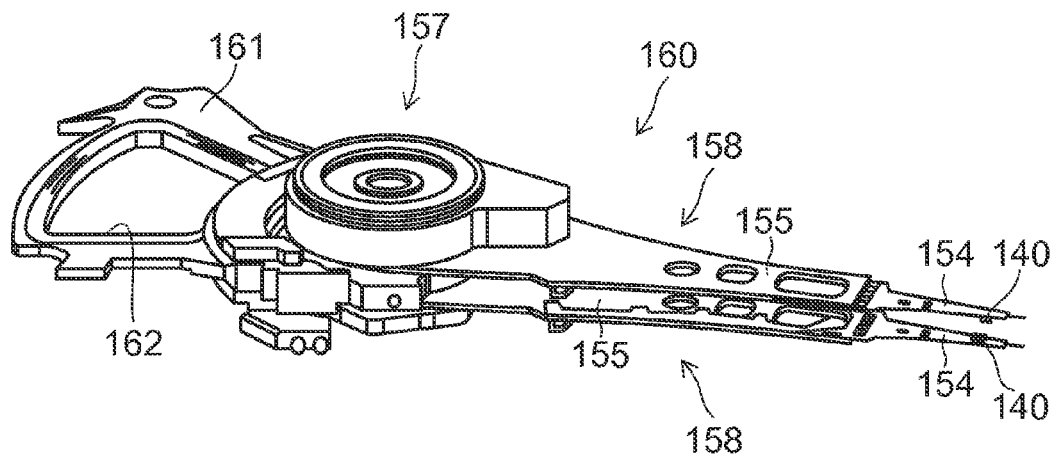
FIG. 15A and FIG. 15B are perspective views showing portions of the magnetic recording and reproducing device according to the ninth embodiment.
Figure 15B:
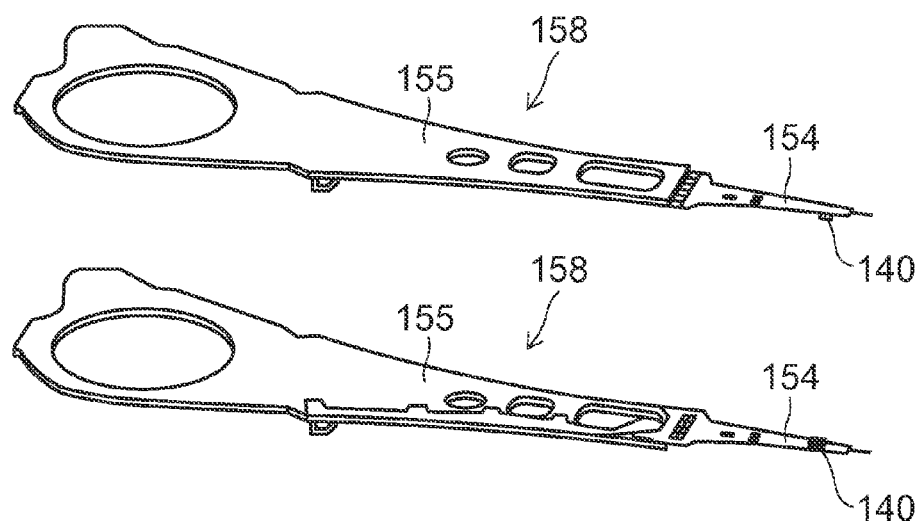

FIG. 15A and FIG. 15B are perspective views showing portions of the magnetic recording and reproducing device 400 according to the ninth embodiment.

The magnetic recording and reproducing device 400 includes the hard disk head according to the sixth embodiment or the seventh embodiment, and a magnetic recording medium 180 in which information is recorded by perpendicular magnetic recording.

As shown in FIG. 14, the magnetic recording and reproducing device 400 is a device that uses a rotary actuator. In the drawing, the magnetic recording medium 180 is mounted to a spindle motor 142 and is rotated in the direction of arrow A by a motor that responds to a control signal from a drive device controller. The magnetic recording and reproducing device 400 may include multiple magnetic recording media 180. The magnetic recording and reproducing device 400 may include a recording medium 181. For example, the magnetic recording and reproducing device 400 is a hybrid HDD (Hard Disk Drive). The recording medium 181 is, for example, a SSD (Solid State Drive). The recording medium 181 includes, for example, nonvolatile memory such as flash memory, etc.

A head slider 140 that performs the recording/reproducing of the information stored in the magnetic recording medium 180 is mounted to the tip of a suspension 154 having a thin-film configuration. For example, the hard disk head according to the sixth embodiment or the seventh embodiment is mounted at the tip vicinity of the head slider 140.

When the magnetic recording medium 180 rotates, the medium-opposing surface of the head slider 140 is held at a prescribed fly height from the surface of the magnetic recording medium 180 by the balance between the downward pressure due to the suspension 154 and the pressure generated by the ABS of the head slider 140. A configuration in which a so-called "contact-sliding" head slider 140 contacts the magnetic recording medium 180 may be used.

The suspension 154 is connected to one end of an actuator arm 155 that includes a bobbin unit holding a drive coil, etc. A voice coil motor 156 which is one type of linear motor is provided at one other end of the actuator arm 155. The voice coil motor 156 may include a drive coil that is wound onto the bobbin unit of the actuator arm 155, and a magnetic circuit made of a permanent magnet and an opposing yoke that are disposed to oppose each other with the coil interposed. The suspension 154 has one end and one other end; the hard disk head is mounted to the one end of the suspension 154; and the actuator arm 155 is connected to the one other end of the suspension 154.

The actuator arm 155 is held by ball bearings provided at two locations on and under a bearing unit 157; and the actuator arm 155 can be caused to rotate and slide unrestrictedly by the voice coil motor 156. As a result, the hard disk head is movable to any position of the magnetic recording medium 180.

FIG. 15A shows the configuration of a portion of the magnetic recording and reproducing device 400 and is an enlarged perspective view of a head stack assembly 160.

FIG. 15B is a perspective view showing an assembly 158 which is a portion of the head stack assembly 160.

As shown in FIG. 15A, the head stack assembly 160 includes the bearing unit 157, the assembly 158 that extends from the bearing unit 157, and a support frame 161 that extends from the bearing unit 157 in the opposite direction of the assembly 158 and supports a coil 162 of the voice coil motor.

As shown in FIG. 15B, the assembly 158 includes the actuator arm 155 that extends from the bearing unit 157, and the suspension 154 that extends from the actuator arm 155.

The head slider 140 is mounted to the tip of the suspension 154. One of the hard disk heads according to the embodiment is mounted to the head slider 140.

The assembly 158 includes the hard disk head according to the embodiment recited above, the head slider 140 to which the hard disk head is mounted, the suspension 154 that has the head slider 140 mounted to the one end, and the actuator arm 155 that is connected to the one other end of the suspension 154.

The suspension 154 includes, for example, lead wires (not shown) that are for writing and reproducing signals, for a heater that adjusts the fly height, for a spin torque oscillator, etc. The lead wires are electrically connected to electrodes of the hard disk head embedded in the head slider 140.

A signal processor 190 is provided to write and reproduce the signals to and from the magnetic recording medium by using the hard disk head. For example, the signal processor 190 is provided on the backside of the drawing of the magnetic recording and reproducing device 400 shown in FIG. 14. The input/output lines of the signal processor 190 are electrically connected to the hard disk head by being connected to electrode pads of the assembly 158.

Thus, the magnetic recording and reproducing device 400 according to the embodiment includes a magnetic recording medium, the hard disk head according to the embodiment recited above, a movable unit that is relatively movable in a state in which the magnetic recording medium and the hard disk head are separated from each other or in contact with each other, a position controller that aligns the hard disk head at a prescribed recording position of the magnetic recording medium, and a signal processor that writes and reproduces signals to and from the magnetic recording medium by using the hard disk head.

According to the embodiment, a magnetic recording and reproducing device that is adaptable to a high recording density is provided.

First Example

An example of the hard disk head 100 according to the sixth embodiment will now be described using FIG. 16.

Figure 16:
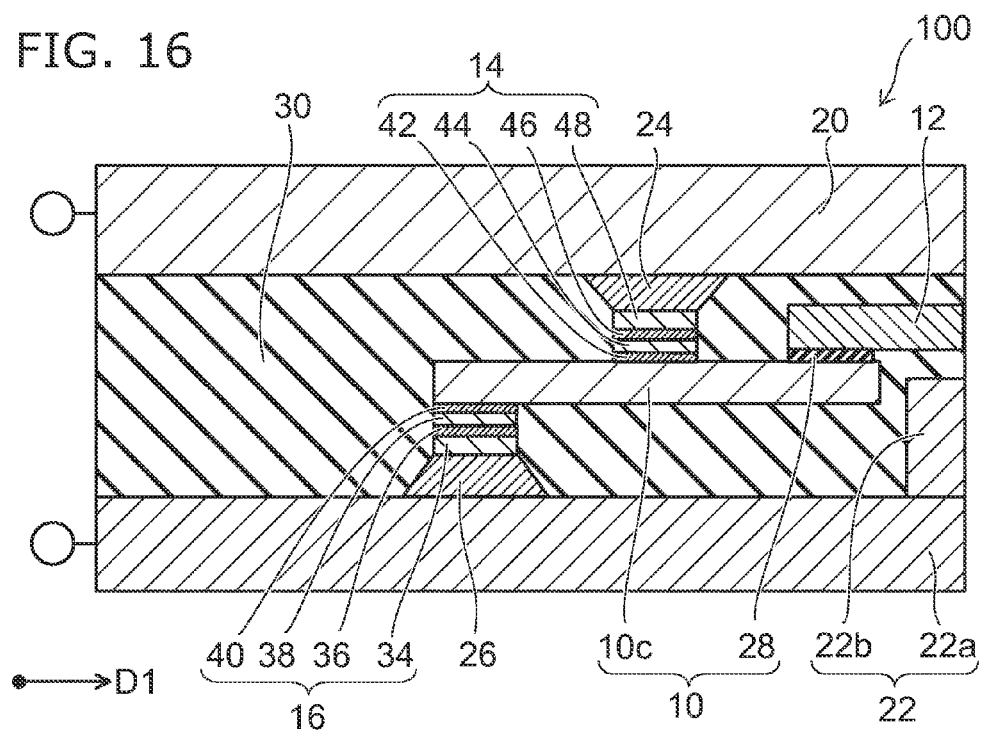
FIG. 16 is a cross-sectional view showing the hard disk head according to the first example.

FIG. 16 is a cross-sectional view showing the hard disk head 100 according to the first example.

Manufacturing processes of the hard disk head 100 will now be described.

On a lower magnetic shield 22a which is also used as an electrode, an IrMn layer having a thickness of 10 nm as the antiferromagnetic unit 26, a CoFe layer 34 having a thickness of 3 nm, a Ru layer 36 having a thickness of 1 nm, a CoFe layer 38 having a thickness of 1 nm, and a $Co_2Fe(Ge_{0.5}Ga_{0.5})$ Heusler alloy (hereinbelow, notated as CFGG) 40 having a thickness of 4 nm were formed in this order using sputtering. The second fixed magnetic unit 16 is formed of the CoFe layer 34, the Ru layer 36, the CoFe layer 38, and the CFGG layer 40. The Ru layer 36 is positioned between the CoFe layer 34 and the CoFe layer 38 and the CFGG layer 40 to form a synthetic structure. In the second fixed magnetic unit 16, the magnetization on the CoFe layer 38 and CFGG layer 40 side is larger than the magnetization of the CoFe layer 34. A lower magnetic shield 22b was additionally provided on the lower magnetic shield 22a to reduce the gap at the ABS. Thereby, the lower magnetic shield 22 is formed.

An aluminum oxide film was formed to bury the second fixed magnetic unit 16 and the lower magnetic shield 22. Planarization was performed to expose a portion of the second fixed magnetic unit 16. A Cu layer was formed by sputtering to be electrically connected to the second fixed magnetic unit 16 but insulated from the shield. A nonmagnetic unit 10c was formed by patterning the Cu to have a length of 100 nm, a width of 12 nm, and a thickness of 10 nm.

On the nonmagnetic unit 10c, a CFGG layer 42 having a thickness of 4 nm, a CoFe layer 44 having a thickness of 1 nm, a Ru layer 46 having a thickness of 1 nm, a CoFe layer 48 having a thickness of 4 nm, and an IrMn layer as the antiferromagnetic unit 24 having a thickness of 10 nm were formed in this order using sputtering. The first fixed magnetic unit 14 is formed of the CFGG layer 42, the CoFe layer 44, the Ru layer 46, and the CoFe layer 48. The Ru layer 46 is positioned between the CoFe layer 48 and the CoFe layer 44 and the CFGG layer 42 to form a synthetic structure. The magnetization of the first fixed magnetic unit 14 on the CoFe layer 44 and CFGG layer 42 side is smaller than the magnetization of the CoFe layer 48.

Aluminum oxide having a thickness of 5 nm was formed on the lower magnetic shield 22 in the portion to be used as the ABS. The aluminum oxide is provided so that the free magnetic unit 12 that is formed subsequently is not in direct contact with the lower magnetic shield 22. After removing the aluminum oxide deposited on the nonmagnetic unit 10, a MgO layer having a thickness of 1 nm was formed as the tunneling barrier layer 28 using sputtering. The nonmagnetic unit 10 is formed of the MgO layer 28 and the nonmagnetic unit 10c. A CFGG layer having a thickness of 5 nm was formed as the free magnetic unit 12 on the MgO layer 28 using sputtering. The CFGG layer was patterned to have a width (in a direction parallel to the ABS) of 12 nm and a length (a direction perpendicular to the ABS) of 10 nm.

A gap film made of aluminum oxide was formed around the free magnetic unit 12 so that the free magnetic unit 12 does not electrically contact the upper magnetic shield that is formed subsequently. The gap film covers around a through-hole remaining on the upper surface of the IrMn layer 24. The upper magnetic shield 20 was formed on the gap film and the IrMn layer 24. At this time, the upper magnetic shield 20 is formed to be electrically connected to the first fixed magnetic unit 14 via the IrMn layer 24 and insulated from the nonmagnetic unit 10 and the free magnetic unit 12.

Annealing of the first fixed magnetic unit 14 and the second fixed magnetic unit 16 was performed while applying a magnetic field in the longitudinal direction (the first direction) of the spin-valve element.

Here, the thickness of the first fixed magnetic unit 14 is different from the thickness of the second fixed magnetic unit 16. The magnetization of the magnetic layer of the first fixed magnetic unit 14 on the nonmagnetic unit 10 side is smaller than the magnetization of the magnetic layer on the antiferromagnetic unit 24 side. Accordingly, in the first fixed magnetic unit 14, the magnetization directions of the magnetic layer on the IrMn side having the large magnetization is oriented in the magnetic field direction; and the magnetization direction of the magnetic layers on the nonmagnetic unit 10 side is oriented in the opposite direction of the applied magnetic field. In the second fixed magnetic unit 16, the magnetization direction on the nonmagnetic unit 10 side is oriented in the same direction as the applied magnetic field. Conversely, the magnetization of the magnetic layer of the second fixed magnetic unit 16 on the nonmagnetic unit 10 side is larger than the magnetization of the magnetic layer on the antiferromagnetic unit 26 side. Accordingly, in the second fixed magnetic unit 16, the magnetization of the magnetic layer on the nonmagnetic unit 10 side having the large magnetization is oriented in the magnetic field direction.

Thus, the first fixed magnetic unit 14 and the second fixed magnetic unit 16 are formed so that the magnetization directions of the magnetic layers facing the nonmagnetic unit 10 are in directions opposite to each other.

The first fixed magnetic unit 14 and the second fixed magnetic unit 16 have widths of 12 nm and lengths of 10 nm.

In the first example, the upper magnetic shield 20 and the lower magnetic shield 22 perform the role of electrodes, are connected to the current source, and are connected to the voltmeter; and the resistance is measured.

By such a configuration, a gap between the lower magnetic shield and the upper magnetic shield of 15 nm could be realized; and an output of 2 mV could be obtained at a sense current of 50 µA. A SN ratio of 25 dB was obtained by combining the hard disk head 100 with a magnetic medium corresponding to 5 Tbit/in$^2$.

Second Example

An example of the hard disk head 200 according to the seventh embodiment will now be described using FIG. 17.

Figure 17:
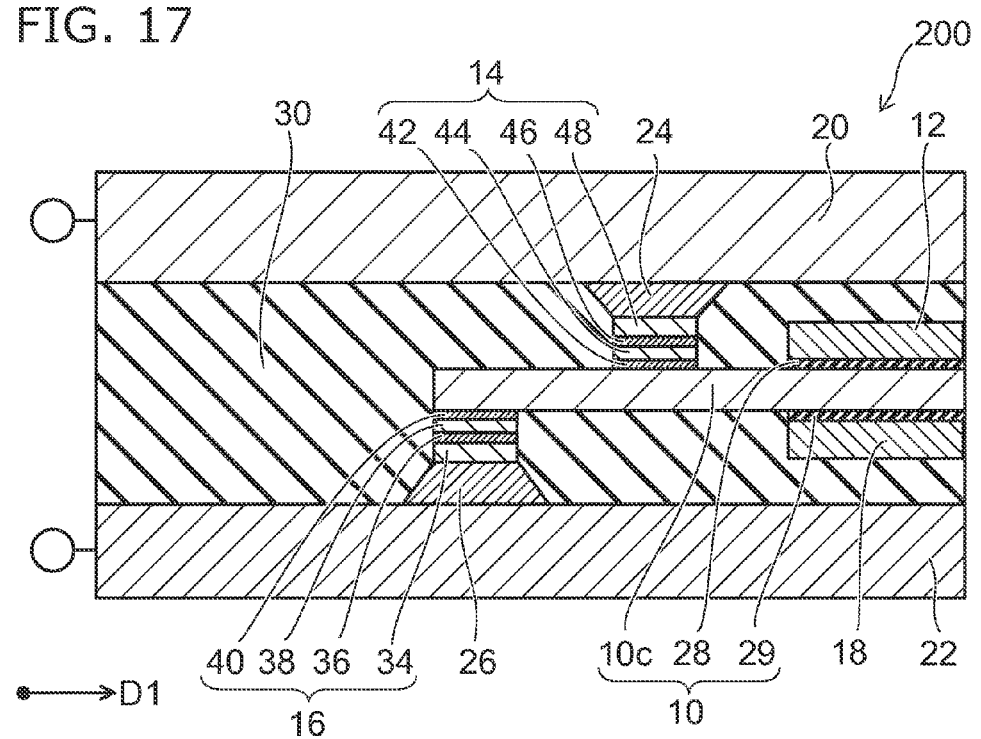
FIG. 17 is a cross-sectional view showing the hard disk head according to the second example.

FIG. 17 is a cross-sectional view showing the hard disk head 200 according to the second example.

First, manufacturing processes of the hard disk head 200 will be described.

On the lower magnetic shield 22 also used as an electrode, an IrMn layer having a thickness of 10 nm as the antiferromagnetic unit 26, the CoFe layer 34 having a thickness of 3 nm, the Ru layer 36 having a thickness of 1 nm, the CoFe layer 38 having a thickness of 1 nm, and the $Co_2Fe(Ge_{0.5}Ga_{0.5})$ Heusler alloy (hereinbelow, notated as CFGG) 40 having a thickness of 4 nm were formed in this order using sputtering. The second fixed magnetic unit 16 is formed of the CoFe layer 34, the Ru layer 36, the CoFe layer 38, and the CFGG layer 40. The Ru layer 36 is positioned between the CoFe layer 34 and the CoFe layer 38 and the CFGG layer 40 to form a synthetic structure. The magnetization of the second fixed magnetic unit 16 on the CoFe layer 38 and CFGG layer 40 side is larger than the magnetization of the CoFe layer 34.

Aluminum oxide having a thickness of 5 nm was formed on the lower magnetic shield 22 in the portion to be used as the ABS. The CFGG layer having a thickness of 3 nm was formed as the second free magnetic unit 18. An MgO layer having a thickness of 1 nm was formed as a tunneling barrier layer 29 on the CFGG layer.

Aluminum oxide was formed to bury the second fixed magnetic unit 16, the second free magnetic unit 18, and the tunneling barrier layer 29. Portions of the tunneling barrier layer 29 and the second fixed magnetic unit 16 were exposed by performing planarization. A Cu layer was formed as the nonmagnetic unit 10c using sputtering. The Cu layer was patterned to have a length of 100 nm, a width of 12 nm, and a thickness of 5 nm. At this time, although the Cu layer contacts the second fixed magnetic unit 16 and contacts the second free magnetic unit 18 via the tunneling barrier layer 29, the Cu layer is not in direct contact with the lower magnetic shield 22.

On the nonmagnetic unit 10c, the CFGG layer 42 having a thickness of 4 nm, the CoFe layer 44 having a thickness of 1 nm, the Ru layer 46 having a thickness of 1 nm, the CoFe layer 48 having a thickness of 4 nm, and an IrMn layer as the antiferromagnetic unit 24 having a thickness of 10 nm were formed in this order using sputtering. The first fixed magnetic unit 14 is formed of the CFGG layer 42, the CoFe layer 44, the Ru layer 46, and the CoFe layer 48. The Ru layer 46 is positioned between the CoFe layer 48 and the CoFe layer 44 and the CFGG layer 42 to form a synthetic structure. The magnetization of the first fixed magnetic unit 14 on the CoFe layer 44 and CFGG layer 42 side is smaller than the magnetization of the CoFe layer 48.

A magnesium oxide layer was formed as the tunneling barrier layer 28 on the nonmagnetic unit 10c using sputtering. The nonmagnetic unit 10 is formed of the nonmagnetic unit 10c and the tunneling barrier layers 28 and 29.

A CFGG layer having a thickness of 3 nm was formed as the first free magnetic unit 12 on the tunneling barrier layer 28 using sputtering. The spin sense terminal had a thickness of 5 nm, a width of 12 nm, and a length of 10 nm.

A gap film made of aluminum oxide was formed to cover the first free magnetic unit 12. The gap film of aluminum oxide was formed to cover around the first fixed magnetic unit 14 and the antiferromagnetic unit 24; and the upper magnetic shield 20 was formed. At this time, the upper magnetic shield 20 contacts only the antiferromagnetic unit 24 but is not in contact with the nonmagnetic unit 10 and the first free magnetic unit 12.

Annealing of the first fixed magnetic unit 14 and the second fixed magnetic unit 16 was performed while applying a magnetic field in the longitudinal direction (the first direction) of the spin-valve element.

Here, the thickness of the first fixed magnetic unit 14 is different from the thickness of the second fixed magnetic unit 16. In the first fixed magnetic unit 14, the magnetization of the magnetic layer on the nonmagnetic unit 10 side is smaller than the magnetization of the magnetic layer on the antiferromagnetic unit 24 side. Accordingly, in the first fixed magnetic unit 14, the magnetization direction of the magnetic layer on the IrMn side having the large magnetization is oriented in the magnetic field direction; and the magnetization direction of the magnetic layer on the nonmagnetic unit 10 side is oriented in the opposite direction of the applied magnetic field. In the second fixed magnetic unit 16, the magnetization direction on the nonmagnetic unit 10 side is oriented in the same direction as the applied magnetic field. Conversely, in the second fixed magnetic unit 16, the magnetization of the magnetic layer on the nonmagnetic unit 10 side is larger than the magnetization of the magnetic layer on the antiferromagnetic unit 26 side. Accordingly, in the second fixed magnetic unit 16, the magnetization of the magnetic layer on the nonmagnetic unit 10 side having the large magnetization is oriented in the magnetic field direction.

Thus, the first fixed magnetic unit 14 and the second fixed magnetic unit 16 are formed so that the magnetization directions of the magnetic layers facing the nonmagnetic unit 10 are in directions opposite to each other.

The first fixed magnetic unit 14 and the second fixed magnetic unit 16 have widths of 12 nm and lengths of 10 nm.

In the hard disk head 200 obtained by the method recited above, the gap between the lower magnetic shield 22 and the upper magnetic shield 20 is large, i.e., 27 nm; but a head that includes two free magnetic units, i.e., the first free magnetic unit 12 and the second free magnetic unit 18, could be realized. In the hard disk head 200, an output of 2.2 mV could be obtained at a sense current of 50 µA. A SN ratio of 26 dB could be obtained by combining the hard disk head 200 with a magnetic medium corresponding to 5 Tbit/in$^2$.

Note

A magnetic recording and reproducing device, comprising:

a nonmagnetic unit extending in a first direction;

a first magnetic unit contacting the nonmagnetic unit, a direction of magnetization of the first magnetic unit being changeable;

a second magnetic unit separated from the first magnetic unit, the second magnetic unit contacting the nonmagnetic unit, a direction of magnetization of the second magnetic unit being pinned;

a third magnetic unit separated from the first magnetic unit and the second magnetic unit, the third magnetic unit contacting the nonmagnetic unit, a direction of magnetization of the third magnetic unit being pinned in a direction different from the direction of the magnetization of the second magnetic unit;

a current source connected to the second magnetic unit and the third magnetic unit, the current source causing a current to flow between the second magnetic unit and the third magnetic unit via the nonmagnetic unit;

a voltage sensor connected to the second magnetic unit and the third magnetic unit, the voltage sensor sensing a voltage between the second magnetic unit and the third magnetic unit;

an upper magnetic shield connected to the first fixed magnetic unit;

a lower magnetic shield connected to the second fixed magnetic unit, the spin-valve element being positioned between the upper magnetic shield and the lower magnetic shield; and a magnetic recording medium, a maximum length of a contact surface between the first magnetic unit and the nonmagnetic unit being not more than a spin diffusion length of the nonmagnetic unit, a dimension of the first magnetic unit in a direction orthogonal to the contact surface being not more than 3 times a spin diffusion length of the first magnetic unit, the first magnetic unit not contacting an external electrode.

Hereinabove, embodiments of the invention are described with reference to specific examples. However, the invention is not limited to these specific examples. For example, one skilled in the art may similarly practice the invention by appropriately selecting specific configurations of components such as the nonmagnetic unit, the free magnetic unit, the first fixed magnetic unit, the second fixed magnetic unit, the antiferromagnetic unit, the magnetic shield, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all spin-valve elements, hard disk heads, and hard disk head assemblies practicable by an appropriate design modification by one skilled in the art based on the spin-valve elements, the hard disk heads, and the hard disk head assemblies described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A spin-valve element, comprising:
   a nonmagnetic unit extending in a first direction;
   a first magnetic unit contacting the nonmagnetic unit, a direction of magnetization of the first magnetic unit being changeable;
   a second magnetic unit separated from the first magnetic unit, the second magnetic unit contacting the nonmagnetic unit, a direction of magnetization of the second magnetic unit being pinned;
   a third magnetic unit separated from the first magnetic unit and the second magnetic unit, the third magnetic unit contacting the nonmagnetic unit, a direction of magnetization of the third magnetic unit being pinned in a direction different from the direction of the magnetization of the second magnetic unit;
   a current source connected to the second magnetic unit and the third magnetic unit, the current source causing a current to flow between the second magnetic unit and the third magnetic unit via the nonmagnetic unit; and
   a voltage sensor connected to the second magnetic unit and the third magnetic unit, the voltage sensor sensing a voltage between the second magnetic unit and the third magnetic unit,
   a maximum length of a contact surface between the first magnetic unit and the nonmagnetic unit being not more than a spin diffusion length of the nonmagnetic unit,
   a length of the first magnetic unit in a direction orthogonal to the contact surface being not more than 3 times a spin diffusion length of the first magnetic unit,
   the first magnetic unit not contacting an external electrode.

2. The element according to claim 1, wherein
   the maximum length of the contact surface between the first magnetic unit and the nonmagnetic unit is 400 nm or less, and
   the length of the first magnetic unit in the direction orthogonal to the contact surface is 100 nm or less.

3. The element according to claim 1, wherein
   the nonmagnetic unit has a first surface extending in the first direction, and
   the first magnetic unit, the second magnetic unit, and the third magnetic unit contact the first surface.

4. The element according to claim 1, wherein
   the nonmagnetic unit has a first surface and a second surface, the first surface extending in the first direction, the second surface extending in the first direction and opposing the first surface,
   the first magnetic unit and the second magnetic unit contact the first surface, and
   the third magnetic unit contacts the second surface.

5. The element according to claim 1, wherein
   the nonmagnetic unit has a first surface and a second surface, the first surface extending in the first direction, the second surface extending in the first direction and opposing the first surface,
   the first magnetic unit contacts the first surface, and
   the second magnetic unit and the third magnetic unit contact the second surface.

6. The element according to claim 1, further comprising:
   a first antiferromagnetic unit contacting the second magnetic unit; and
   a second antiferromagnetic unit contacting the third magnetic unit.

7. The element according to claim 1, wherein the direction of the magnetization of the second magnetic unit is opposite to the direction of the magnetization of the third magnetic unit.

8. The element according to claim 1, wherein at least one of the second magnetic unit or the third magnetic unit has a synthetic structure.

9. The element according to claim 1, wherein
   the nonmagnetic unit has an end portion in the first direction and
   a distance in the first direction between the first magnetic unit and the end portion is shorter than a distance between the end portion and the second magnetic unit and shorter than a distance between the end portion and the third magnetic unit.

10. The element according to claim 1, wherein
    the nonmagnetic unit has a first surface that intersects the first direction,
    the first magnetic unit has a second surface that intersects the first direction, and
    the first surface and the second surface overlaps in a direction orthogonal to the first direction.

11. The element according to claim 1, wherein an end surface in the first direction of the first magnetic unit is positioned on the first-direction side of an end surface in the first direction of the nonmagnetic unit.

12. The element according to claim 1, wherein at least one of the first magnetic unit, the second magnetic unit, or the third magnetic unit includes a layer made of a half-metal magnetic body.

13. The element according to claim 1, wherein the nonmagnetic unit includes a tunneling barrier layer in at least one of a region contacting the first magnetic unit, a region contacting the second magnetic unit, or a region contacting the first magnetic unit.

14. The element according to claim 1, further comprising a pair of hard bias units applying, to the first magnetic unit, a magnetic field in a direction intersecting the first direction,
    the first magnetic unit being provided between the pair of hard bias units in a direction orthogonal to the first direction.

15. The element according to claim 1, further comprising a fourth magnetic unit separated from the first magnetic unit, the second magnetic unit, and the third magnetic unit, the fourth magnetic unit contacting the nonmagnetic unit, a direction of magnetization of the fourth magnetic unit being changeable,
    the fourth magnetic unit not contacting an external electrode.

16. The element according to claim 15, wherein at least a portion of the fourth magnetic unit opposes the first magnetic unit with the nonmagnetic unit interposed.

17. The element according to claim 15, wherein a material of the fourth magnetic unit is the same as a material of the first magnetic unit.

18. The element according to claim 15, further comprising a pair of hard bias units applying, to the first magnetic unit and the fourth magnetic unit, a magnetic field in a direction intersecting the first direction,
- the first magnetic unit and the fourth magnetic unit being provided between the pair of hard bias units in a direction orthogonal to the first direction.

19. A hard disk head, comprising:
- the spin-valve element according to claim 1;
- an upper magnetic shield connected to the second magnetic unit; and
- a lower magnetic shield connected to the third magnetic unit, the spin-valve element being positioned between the upper magnetic shield and the lower magnetic shield.

20. A hard disk head assembly, comprising the hard disk heads according to claim 19 multiply overlapping each other in a direction from the lower magnetic shield toward the upper magnetic shield.

* * * * *